(12) United States Patent
Park et al.

(10) Patent No.: US 9,762,900 B2
(45) Date of Patent: Sep. 12, 2017

(54) METHOD AND APPARATUS FOR ENCODING/DECODING VIDEO IN INTRA PREDICTION MODE

(75) Inventors: Joonyoung Park, Seoul (KR); Seungwook Park, Seoul (KR); Jaehyun Lim, Seoul (KR); Jungsun Kim, Seoul (KR); Younghee Choi, Seoul (KR); Byeongmoon Jeon, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 14/126,916

(22) PCT Filed: Dec. 5, 2011

(86) PCT No.: PCT/KR2011/009358
§ 371 (c)(1),
(2), (4) Date: Jan. 10, 2014

(87) PCT Pub. No.: WO2012/173315
PCT Pub. Date: Dec. 20, 2012

(65) Prior Publication Data
US 2014/0126629 A1 May 8, 2014

Related U.S. Application Data

(60) Provisional application No. 61/497,955, filed on Jun. 17, 2011, provisional application No. 61/504,235, (Continued)

(51) Int. Cl.
*H04N 19/11* (2014.01)
*H04N 19/176* (2014.01)
*H04N 19/463* (2014.01)

(52) U.S. Cl.
CPC ....... *H04N 19/00042* (2013.01); *H04N 19/11* (2014.11); *H04N 19/176* (2014.11); *H04N 19/463* (2014.11)

(58) Field of Classification Search
CPC .............................................. H04N 19/00042
See application file for complete search history.

(56) References Cited

U.S. PATENT DOCUMENTS

2004/0008771 A1* 1/2004 Karczewicz ......... H04N 19/197
375/240.03
2011/0317757 A1* 12/2011 Coban .................. H04N 19/197
375/240.02

(Continued)

FOREIGN PATENT DOCUMENTS

KR  10-2002-0082795 A  10/2002
KR  10-2009-0012985 A  2/2009

(Continued)

OTHER PUBLICATIONS

International Search Report dated May 7, 2012 for Application No. PCT/KR2011/009358, with English Translation, 4 pages.

*Primary Examiner* — Dave Czekaj
*Assistant Examiner* — Berteau Joisil
(74) *Attorney, Agent, or Firm* — Fish & Richardson P.C.

(57) ABSTRACT

Provided is a method for decoding video, which performs prediction in an intra mode. The method for decoding video according to the invention comprises steps of: creating a current table index using a code number and MPM index information; and deriving a current prediction mode by adopting an index mapping table in the current table index. According to the present invention, video encoding/decoding efficiency can be improved.

7 Claims, 15 Drawing Sheets

Related U.S. Application Data filed on Jul. 3, 2011, provisional application No. 61/506,158, filed on Jul. 10, 2011, provisional application No. 61/510,034, filed on Jul. 20, 2011.

(56) References Cited

U.S. PATENT DOCUMENTS

| | | | |
|---|---|---|---|
| 2012/0177118 A1* | 7/2012 | Karczewicz | H04N 19/137 375/240.13 |
| 2013/0243087 A1* | 9/2013 | Lee | H04N 19/00569 375/240.12 |
| 2013/0272623 A1* | 10/2013 | Jeon | H04N 19/159 382/238 |

FOREIGN PATENT DOCUMENTS

| | | |
|---|---|---|
| KR | 10-2011-0019855 A | 3/2011 |
| WO | WO 2011/021844 A2 | 2/2011 |

* cited by examiner

METHOD AND APPARATUS FOR ENCODING/DECODING VIDEO IN INTRA PREDICTION MODE

CROSS REFERENCE TO RELATED APPLICATIONS

This application is a U.S. National Phase Application under 35 U.S.C. §371 of International Application PCT/KR2011/009358, filed on Dec. 5, 2011, which claims the benefit of U.S. Provisional Application No. 61/497,955, filed on Jun. 17, 2011, U.S. Provisional Application No. 61/504,235, filed on Jul. 3, 2011, U.S. Provisional Application No. 61/506,158, filed on Jul. 10, 2011, and U.S. Provisional Application No. 61/510,034, filed on Jul. 20, 2011, the entire content of each of the prior applications is hereby incorporated by reference.

BACKGROUND OF THE INVENTION

Field of the Invention

The present invention relates to a video processing technique, and more particularly, to intra prediction mode encoding/decoding method and device.

Related Art

In recent years, demands for a high-resolution and high-quality video such as a high definition (HD) video and an ultra high definition (UHD) video have increased in various fields of applications. However, as video data has a higher resolution and higher quality, an amount of data or a bit rate of the video increases more than existing video data. Accordingly, when video data is transferred using media such as existing wired or wireless broadband lines or is stored in existing storage media, the transfer cost and the storage cost thereof increase. High-efficiency video compressing techniques can be used to solve such problems.

Various techniques such as an inter prediction technique of predicting pixel values included in a current picture from a previous or subsequent picture of the current picture, an intra prediction technique of predicting pixel values included in a current picture using pixel information in the current picture, and an entropy coding technique of allocating a short codeword to a value of a high appearance frequency and allocating a long codeword to a value of a low appearance frequency are known as the video compressing techniques. It is possible to effectively compress and transfer or store video data using such video compressing techniques.

SUMMARY OF THE INVENTION

An object of the invention is to provide video encoding method and device which can improve video encoding/decoding efficiency.

Another object of the invention is to provide video decoding method and device which can improve video encoding/decoding efficiency.

Still another object of the invention is to provide intra prediction mode encoding method and device which can improve video encoding/decoding efficiency.

Still another object of the invention is to provide intra prediction mode decoding method and device which can improve video encoding/decoding efficiency.

According to an aspect of the invention, there is provided a video decoding method of predicting a current block in an intra mode. The video decoding method includes creating a current table index using a code number and MPM index information, and deriving a current prediction mode by applying an index mapping table to the current table index, the MPM index information includes the number of MPM candidates and the index values of the MPM candidates, the MPM candidate indices are indices allocated to the MPM candidates in the index mapping table, the current prediction mode is an intra prediction mode of a current prediction unit, and the current table index is an index allocated to the current prediction mode in the index mapping table.

The video decoding method may further include converting a codeword received from an encoder into the code number using an inverse VLC table.

The number of entries in the index mapping table may be equal to the number of possible intra prediction modes of the current prediction unit.

The index values of the MPM candidates may be derived by applying an inverse index mapping table to mode values of the MPM candidates.

The number of MPM candidates may be a predetermined fixed value.

The predetermined fixed value may be any of 2, 3, and 4.

The video decoding method may further include a step of updating the index mapping table on the basis of an occurrence frequency of the current table index.

The index mapping table may be updated for a prediction unit in which one of the MPM candidates is selected as the intra prediction mode thereof.

According to another aspect of the invention, there is provided a video decoder. The video decoder includes an entropy decoding module that creates a current table index using a code number and MPM index information and derives a current prediction mode by applying an index mapping table to the current table index, and a prediction module that performs intra prediction on a current block using the derived current prediction mode, the MPM index information includes the number of MPM candidates and the index values of the MPM candidates, the MPM candidate indices are indices allocated to the MPM candidates in the index mapping table, the current prediction mode is an intra prediction mode of a current prediction unit, and the current table index is an index allocated to the current prediction mode in the index mapping table.

According to still another aspect of the invention, there is provided an intra prediction mode decoding method of entropy-decoding intra prediction mode information. The intra prediction mode decoding method includes creating a current table index using a code number and MPM index information, and deriving a current prediction mode by applying an index mapping table to the current table index, the MPM index information includes the number of MPM candidates and the index values of the MPM candidates, the MPM candidate indices are indices allocated to the MPM candidates in the index mapping table, the current prediction mode is an intra prediction mode of a current prediction unit, and the current table index is an index allocated to the current prediction mode in the index mapping table.

The intra prediction mode decoding method may further include converting a codeword received from an encoder into the code number using an inverse VLC table.

The number of entries in the index mapping table may be equal to the number of possible intra prediction modes of the current prediction unit.

The index values of the MPM candidates may be derived by applying an inverse index mapping table to mode values of the MPM candidates.

The number of MPM candidates may be a predetermined fixed value.

The predetermined fixed value may be any of 2, 3, and 4.

The intra prediction mode decoding method may further include updating the index mapping table on the basis of an occurrence frequency of the current table index.

The index mapping table may be updated for a prediction unit in which one of the MPM candidates is selected as the intra prediction mode thereof.

By employing the video encoding method and device according to the invention, it is possible to improve video encoding/decoding efficiency.

By employing the video decoding method and device according to the invention, it is possible to improve video encoding/decoding efficiency.

By employing the intra prediction mode encoding method and device according to the invention, it is possible to improve video encoding/decoding efficiency.

By employing the intra prediction mode decoding method and device according to the invention, it is possible to improve video encoding/decoding efficiency.

DESCRIPTION OF EXEMPLARY EMBODIMENTS

Figure 1:
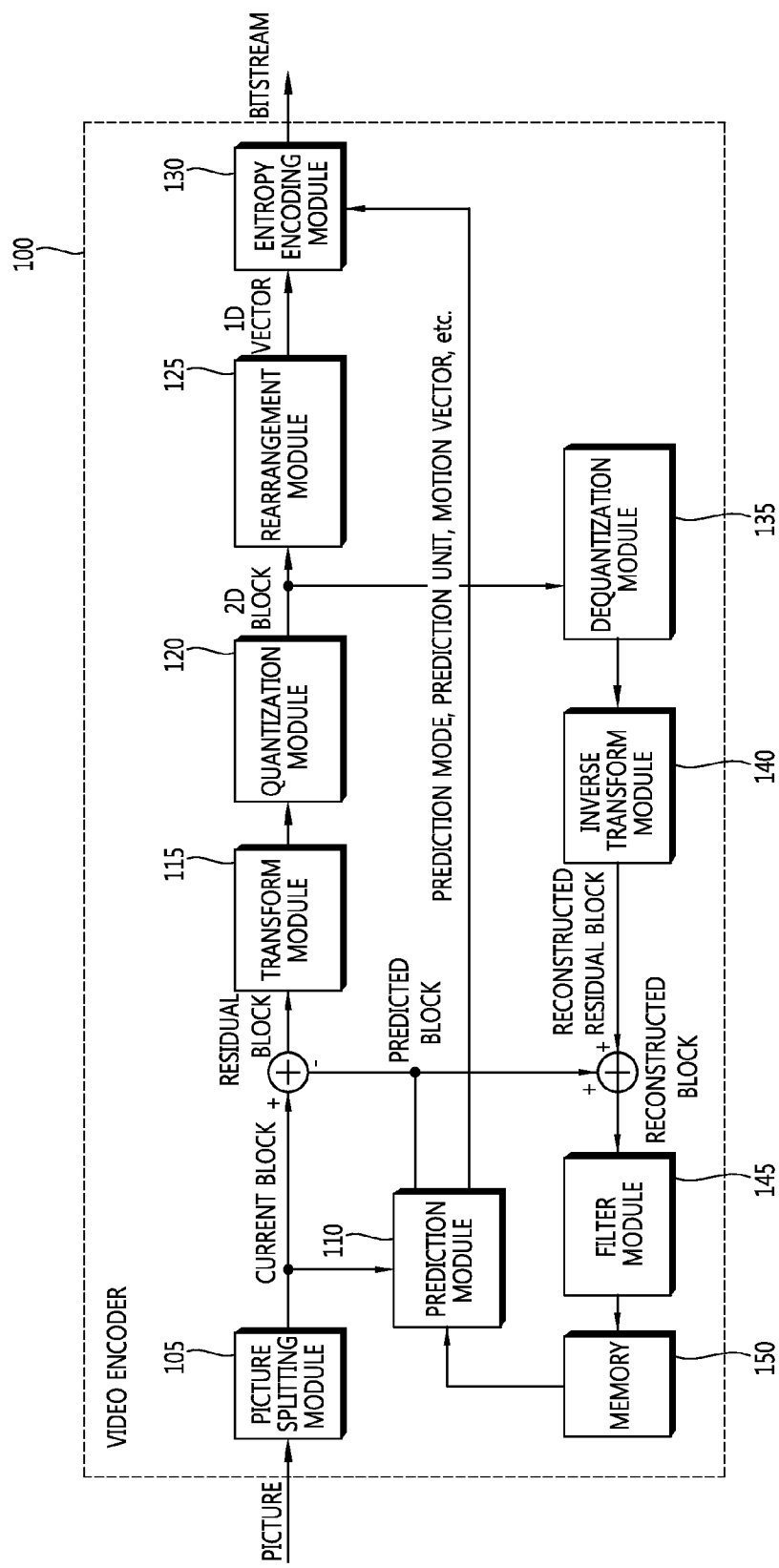
FIG. 1 is a block diagram schematically illustrating a video encoder according to an embodiment of the invention.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Some elements may not be essential elements for performing essential functions of the invention but may be selective elements for merely improving performance. The invention may be embodied by only the elements essential to embody the invention, other than the elements used to merely improve performance, and a structure including only the essential elements other than the selective elements used to merely improve performance belongs to the scope of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the invention. Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 may split an input picture into at least one process unit. Here, the process unit may be a prediction unit (hereinafter, referred to as a "PU"), a transform unit (hereinafter, referred to as a "TU"), or a coding unit (hereinafter, referred to as a "CU").

The prediction module 110 includes an inter prediction module that performs an inter prediction process and an intra prediction module that performs an intra prediction process, as will be described later. The prediction module 110 predicts the process unit of the picture split by the picture splitting module 105 to create a predicted block. The process unit of a picture in the prediction module 110 may be a CU, a TU, or a PU. It may be determined whether the prediction performed on the corresponding process unit is inter prediction or intra prediction, and specific details (for example, a prediction mode) of the prediction methods may be determined. The process unit subjected to the prediction process may be different from the process unit of which the prediction method and the specific details are determined. For example, the prediction method and the prediction mode may be determined by the prediction units and the prediction process may be performed by the transform units. A residual value (residual block) between a created predicted block and an original block may be input to the transform module 115. The prediction mode information, the motion vector information, and the like used for the prediction may be encoded along with the residual value by the entropy encoding module 130 and may be transmitted to the decoder.

The transform module 115 performs a transform process on the residual block by the transform units and creates transform coefficients. The transform unit in the transform module 115 may be a transform unit and may have a quad tree structure. The size of the transform unit may be determined within a predetermined range of largest and smallest sizes. The transform module 115 may transform the residual block using a DCT (Discrete Cosine Transform) and/or a DST (Discrete Sine Transform).

The quantization module 120 may quantize the residual values transformed by the transform module 115 and may create quantization coefficients. The values derived by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 may perform an entropy encoding process on the quantization coefficients rearranged by the rearrangement module 125. The entropy encoding module 130 may encode a variety of information such as quantization coefficient information and block type information of a coding unit, prediction mode information, split unit information, prediction unit information, transfer unit information, motion vector information, reference picture information, block interpolation information, and filtering information which are transmitted from the rearrangement module 125 and the prediction module 110.

Entropy encoding methods such as an exponential golomb method, a CAVLC (Context-Adaptive Variable Length Coding) method, and a CABAC (Context-Adaptive Binary Arithmetic Coding) method may be used for entropy encoding. For example, a table used to perform an entropy encoding process such as a viarable length coding (hereinafter, referred to as "VLC") table may be stored in the entropy encoding module 130. The entropy encoding module 130 may perform the entropy encoding process using the stored VLC table. For example, in the CABAC entropy encoding method, the entropy encoding module 130 may binarize a symbol, convert the binarized symbol into bins, and then perform an arithmetic encoding process on the bins depending on occurrence probabilities of the bins to create a bitstream.

When the entropy encoding is applied, a low index and a short codeword corresponding thereto may be allocated to a symbol of a high occurrence probability, and a high index and a long codeword corresponding thereto may be allocated to a symbol of a low occurrence probability. Therefore, it is possible to reduce the bit rate of the symbols to be encoded and to improve video compression performance by the entropy encoding.

The dequantization module 135 dequantizes the values quantized by the quantization module 120. The inverse transform module 140 inversely transforms the values dequantized by the dequantization module 135. The residual value created by the dequantization module 135 and the inverse transform module 140 may be added with the predicted block predicted by the prediction module 110 to create a reconstructed block.

The filter module 145 may apply a deblocking filter and/or an ALF (Adaptive Loop Filter) to the reconstructed picture.

The deblocking filter may remove a block distortion generated at the boundary between blocks in the reconstructed picture. The ALF may perform a filtering process on the basis of the resultant values of comparison of the original picture with the reconstructed picture of which the blocks have been filtered by the deblocking filter. The ALF may be applied only when high efficiency is necessary.

On the other hand, the filter module 145 may not perform a filtering process on the reconstructed block used for the inter prediction.

The memory 150 stores the reconstructed block or picture obtained by the filter module 145. The reconstructed block or picture stored in the memory 150 is supplied to the prediction module 110 that performs the inter prediction.

A coding unit (CU) is a unit by which a picture is subjected to encoding/decoding, may have a depth based on a quad tree structure, and may be split. The coding unit may have various sizes such as 64×64, 32×32, 16×16, and 8×8.

The encoder may transmit information on the largest coding unit (LCU) and the smallest coding (SCU) to the decoder. Information (depth information) on the number of splitting times along with the information on the largest coding unit and/or the smallest coding unit may be transmitted to the decoder. Information on whether a coding unit is split on the basis of the quad tree structure may be transmitted from the encoder to the decoder using flag information such as a split flag.

A coding unit may be split into plural prediction units. When intra prediction is performed, a prediction mode may be determined by the prediction units and a prediction process may be performed by the prediction units. At this time, the prediction mode may be determined by the prediction units and the intra prediction process may be performed by the transform units.

Figure 2:
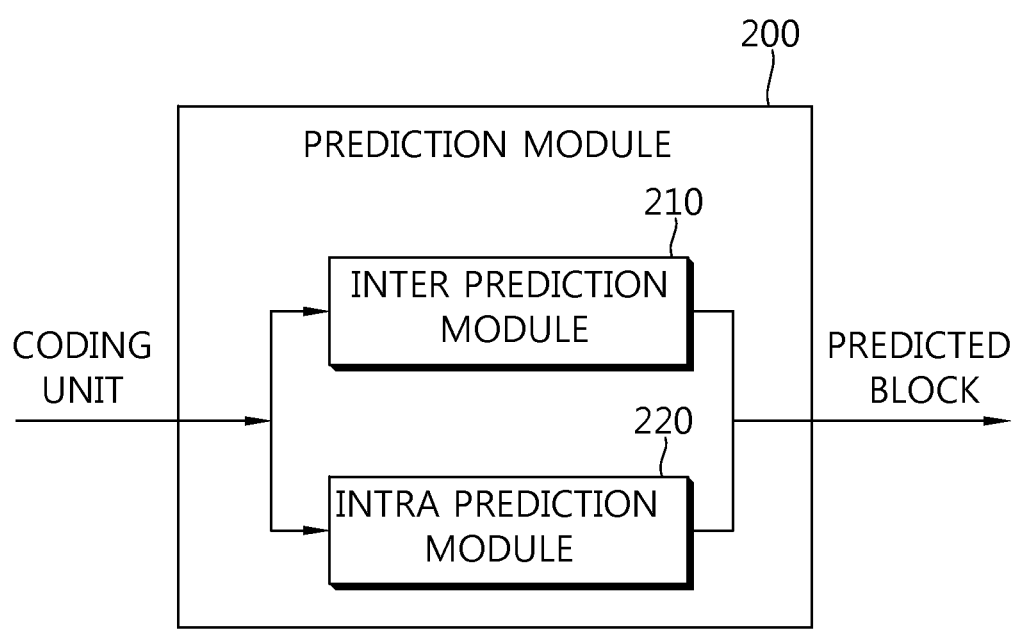
FIG. 2 is a conceptual diagram schematically illustrating a prediction module of the video encoder according to the embodiment of the invention.

FIG. 2 is a conceptual diagram schematically illustrating a prediction module according to an embodiment of the invention. Referring to FIG. 2, the prediction module 200 includes an inter prediction module 210 and an intra prediction module 220.

The inter prediction module 210 may perform a prediction process on the basis of information of at least one picture of a previous picture and a subsequent picture of a current picture and may construct a predicted block. The intra prediction module 220 may perform a prediction process on the basis of pixel information in a current picture and may construct a predicted block.

The inter prediction module 210 may select a reference picture for a prediction unit and may select a reference block having the same size as the prediction unit in the unit of integer pixel samples. Then, the inter prediction unit 210 may construct a predicted block, which is most similar to a current prediction unit, minimizes a residual signal, and minimizes the magnitude of a motion vector to be encoded, in the unit of integer or less pixel samples such as in the unit of ½ pixel samples and in the unit of ¼ pixel samples. Here, the motion vector may be expressed in the unit of integer or less pixels, may be expressed, for example, in the unit of ¼ pixels for luma pixels, and may be expressed in the unit of ⅛ pixels for chroma pixels.

Information on the index of a reference picture selected by the inter prediction module 210 and the motion vector may be encoded and transmitted to the decoder.

Figure 3:
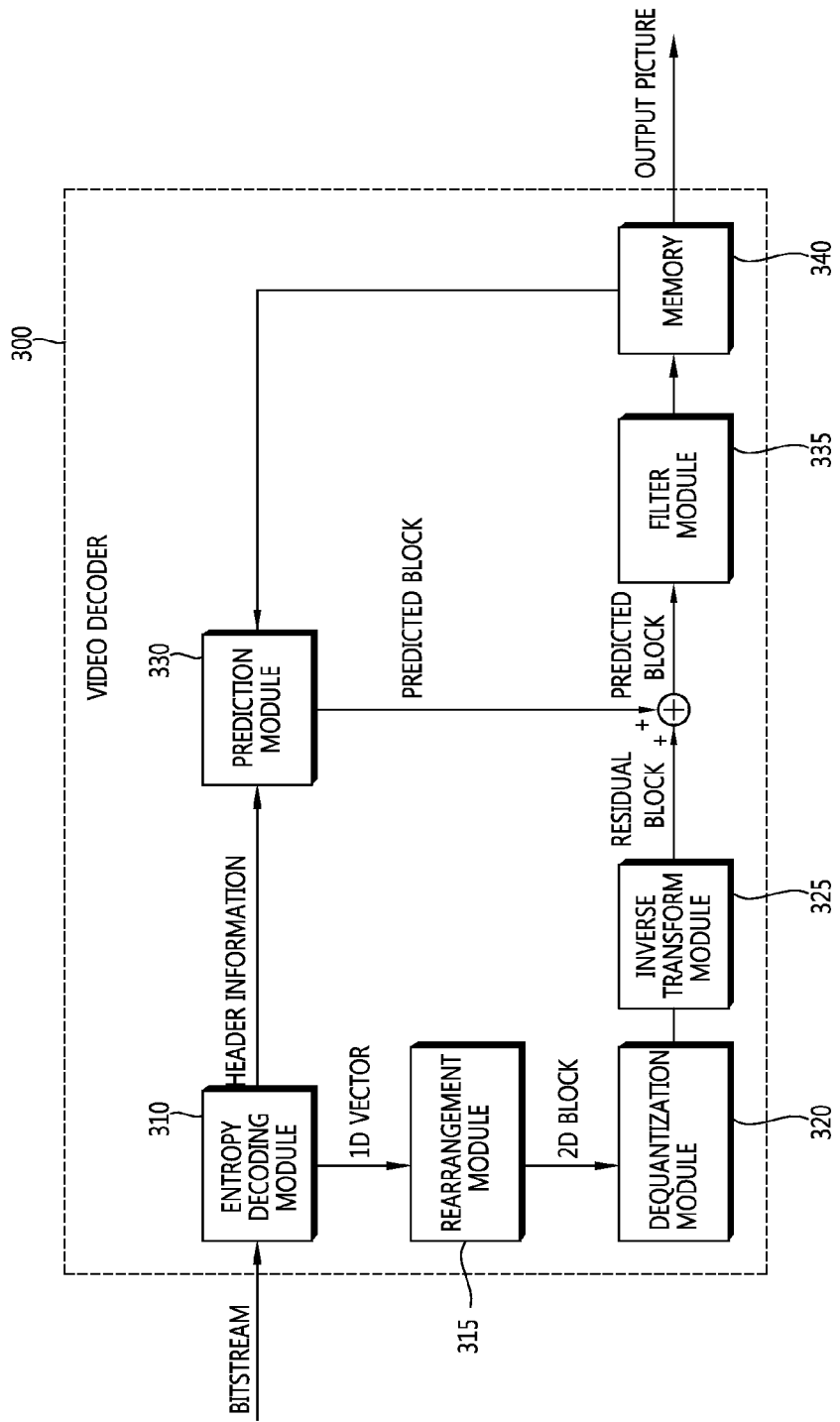
FIG. 3 is a block diagram schematically illustrating a video decoder according to an embodiment of the invention.

FIG. 3 is a block diagram schematically illustrating a video decoder according to an embodiment of the invention. Referring to FIG. 3, the video decoder 300 includes an entropy decoding module 310, a rearrangement module 315, a dequantization module 320, an inverse transform module 325, a prediction module 330, a filter module 335, and a memory 340.

When a video bitstream is input from the video encoder, the input bitstream may be decoded on the basis of the order in which video information is processed by the video encoder.

The entropy decoding module 310 may perform an entropy decoding process on the input bitstream, and the entropy decoding method is similar to the above-mentioned entropy encoding method. For example, when the video encoder uses a variable length coding (hereinafter, referred to as "VLC") method such as the CAVLC method to perform the entropy encoding process, the entropy decoding module 310 may implement the same VLC table as the VLC table used in the encoder and may perform the entropy decoding process. When the video encoder uses the CABAC method to perform the entropy encoding process, the entropy decoding module 310 may perform the entropy decoding process using the CABAC method to correspond thereto.

When the entropy decoding is applied, a low index and a short codeword corresponding thereto may be allocated to a symbol of a high occurrence probability, and a high index and a long codeword corresponding thereto may be allocated to a symbol of a low occurrence probability. Therefore, it is possible to reduce the bit rate of the symbols to be encoded and to improve video compression performance by the entropy coding.

Information for constructing a predicted block out of the information decoded by the entropy decoding module 310 may be supplied to the prediction module 330, and the residual value entropy-decoded by the entropy decoding module may be input to the rearrangement module 315.

The rearrangement module 315 may rearrange the bitstream entropy-decoded by the entropy decoding module 310 on the basis of the rearrangement method used in the video encoder. The rearrangement module 315 may reconstruct and rearrange coefficients expressed in the form of a one-dimensional vector into coefficients in the form of a two-dimensional block. The rearrangement module 315 may be supplied with information associated with the coefficient scanning performed by the encoder and may perform the rearrangement using a method of inversely scanning the coefficients on the basis of the scanning order in which the scanning is performed by the encoder.

The dequantization module 320 may perform dequantization on the basis of the quantization parameters supplied from the encoder and the coefficient values of the rearranged block.

The inverse transform module 325 may perform the inverse DCT and/or inverse DST of the DCT and/or DST, which has been performed by the transform module of the encoder, on the quantization result from the video encoder. The inverse transform may be performed on the basis of a transfer unit or a split unit of a picture determined by the encoder. The transform module of the encoder may selectively perform the DCT and/or DST depending on plural information pieces such as the prediction method, the size of a current block, and the prediction direction, and the inverse transform module 325 of the decoder may perform the inverse transform on the basis of the transform information on the transform performed by the transform module of the encoder.

The prediction module 330 may construct a predicted block on the basis of predicted block construction information supplied from the entropy decoding module 310 and the previously-decoded block and/or picture information supplied from the memory 340. The reconstructed block may be created using the predicted block constructed by the prediction module 330 and the residual block supplied from the inverse transform module 325.

The reconstructed block and/or picture may be supplied to the filter module 335. The filter module 335 may perform a deblocking filtering process, an SAO (Sample Adaptive Offset) process, and/or an adaptive loop filtering (ALF) process on the reconstructed block and/or picture.

The memory 340 may store the reconstructed picture or block for use as a reference picture or a reference block and may supply the reconstructed picture to an output module.

Figure 4:
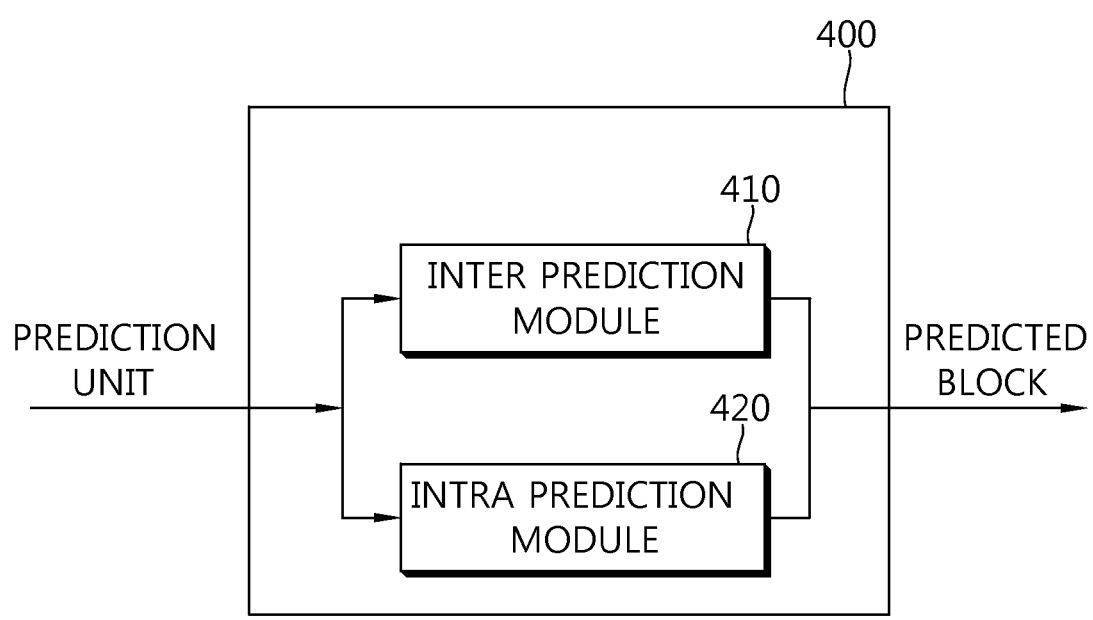
FIG. 4 is a conceptual diagram schematically illustrating a prediction module of the video decoder according to the embodiment of the invention.

FIG. 4 is a conceptual diagram schematically illustrating a prediction module of a video decoder according to an embodiment of the invention.

Referring to FIG. 4, the prediction module 400 includes an intra prediction module 410 and an inter prediction module 420.

The intra prediction module 410 may construct a predicted block on the basis of pixel information in a current picture, when the prediction mode of a prediction unit is an intra prediction mode.

The inter prediction module 420 may perform an inter prediction process on a current prediction unit on the basis of information included in at least one picture out of a previous picture or a subsequent picture of a current picture including the current prediction unit using information necessary for inter prediction of the current prediction unit which is supplied from the video encoder, for example, information on the motion vector and the reference picture index, when the prediction mode of the corresponding prediction unit is an inter prediction mode.

Here, the motion information may be derived from a skip flag, a merge flag, and the like of the coding unit received from the encoder, when the flags are confirmed.

Hereinafter, when a "video" or a "image" has the same meaning as a "picture" in some configurations or expressions of the invention, a "picture" may be described as a "video" or a "image". The inter prediction and an inter-picture prediction have the same meaning, and the intra prediction and an intra-picture prediction have the same meaning.

As described above, the intra prediction module may perform a prediction process on the basis of pixel information in a current picture and may construct a predicted block of the current block. The intra prediction mode may be classified into a vertical mode, a horizontal mode, a DC mode, an angular mode, and the like depending on positions and prediction methods of reference pixels used to predict the pixel values of the current block. In the vertical mode, the prediction may be performed in the vertical direction using the pixel values of a neighboring block. In the horizontal mode, the prediction may be performed in the horizontal direction using the pixel values of a neighboring block. In the DC mode, a predicted block may be constructed by averaging the pixel values in the current block. In the angular mode, the prediction may be performed on the basis of a predetermined angle and/or direction for each mode.

Intra prediction mode information may be transmitted as a value itself indicating the prediction mode, but a method of transmitting the intra prediction mode information using a predicted mode value of the intra prediction mode may be used to improve the transmission efficiency. Hereinafter, a predicted mode of a current intra prediction mode is referred to as a MPM (Most Probable Mode).

Figure 5:
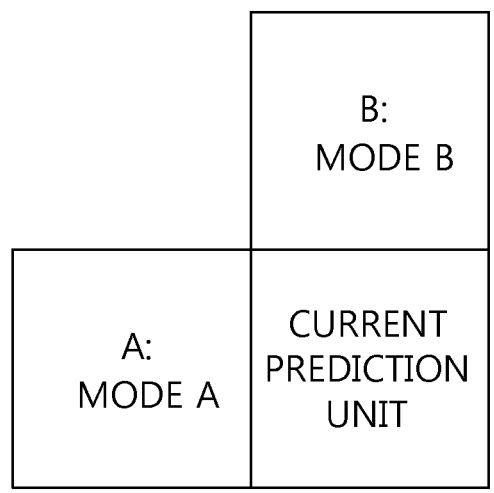
FIG. 5 is a conceptual diagram schematically illustrating an example of an MPM deriving method.

FIG. 5 is a conceptual diagram schematically illustrating an example of an MPM deriving method. In the example illustrated in FIG. 5, a current prediction unit means a unit on which prediction is currently performed. Prediction unit A represents a prediction unit neighboring the top of the current prediction unit and prediction unit B represents a prediction unit neighboring the left side of the current prediction unit. Prediction unit A, prediction unit B, and the current prediction unit may have the same size as illustrated in FIG. 5, but may have different sizes.

Referring to FIG. 5, the encoder and the decoder may construct an MPM candidate list using the prediction mode (mode A) of prediction unit A and the prediction mode (mode B) of prediction unit B. When mode A is equal to mode B, the number of MPM candidates may be one. When mode A is different from mode B, the number of MPM candidates may be two. The number of MPM candidates is not limited to one or two as in the example illustrated in FIG. 5, but may be three or more.

The encoder and the decoder may employ a fixed number of MPM candidates. Here, the number of entries of the MPM candidate list, that is, the number of MPM candidates in the MPM candidate list, may be a fixed value. The fixed number of MPM candidates may be two, or may be three, four, or more.

For example, it is assumed that two MPM candidates are employed in the example illustrated in FIG. 5. Then, the number of MPM candidates derived when mode A and mode B are equal to each other may be one and thus the other MPM candidate may be set to a DC mode, a planar mode, or another predetermined prediction mode.

The intra prediction mode of the current prediction unit may be the same prediction mode as any one of the MPM candidates. Information on whether a candidate having the same prediction mode as the current prediction unit is present in the MPM candidates may be transmitted from the encoder to the decoder via a predetermined flag. The flag may be, for example, prev_intra_luma_pred_flag. When the flag is 1, a candidate having the same prediction mode as the current prediction unit may be present in the MPM candidates.

When the flag is 1 and the number of MPM candidates is 1, the prediction mode of the MPM candidate may be the prediction mode of the current prediction unit and thus the encoder may not transmit additional information to the decoder. However, when the flag is 1 and the number of MPM candidates is 2 or more, the decoder cannot know whether the prediction mode of the current prediction unit is equal to the prediction mode of any candidate of the MPM candidates. Therefore, the encoder may transmit an index indicating of what MPM candidate the prediction mode of the current prediction unit is equal to the prediction mode to the decoder. The decoder may determine the prediction mode of the current prediction unit using the index. For example, the index may be mpm_idx.

When all the prediction modes of the MPM candidates are different from the prediction mode of the current prediction unit, for example, when the value of the flag indicating that a candidate having the same prediction mode as the current prediction unit is present in the MPM candidates is 0, the encoder may transmit intra prediction mode information of the current prediction unit to the decoder using a remaining mode.

The encoder and the decoder may use an MPRM (Most Probable Remaining Mode) along with the MPM to perform intra prediction mode encoding/decoding. Here, the encoder and the decoder may construct an MPRM list including MPRM candidates using the intra prediction modes other than the MPM candidates.

When the MPRM is used and the prediction modes of the MPM candidates are different from the prediction mode of the current prediction unit, the encoder may transmit information on whether a candidate having the same prediction mode as the current prediction unit is present in the MPRM candidates to the decoder using a predetermined flag. For example, the flag may be mprm_pred_flag.

When a candidate having the same prediction mode as the current prediction unit is present in the MPRM candidates, the encoder may transmit an index indicating of what MPRM candidate the prediction mode of the current prediction unit is equal to the prediction mode to the decoder. For example, the index may be mprm_idx.

When all the prediction modes of the MPRM candidates are different from the prediction mode of the current prediction unit, the encoder may transmit the intra prediction mode information of the current prediction unit to the decoder using a remaining mode.

The above-mentioned examples may be applied to a case where the MPM and the MPRM are together used as well as a case where only the MPM is used.

Figure 6:
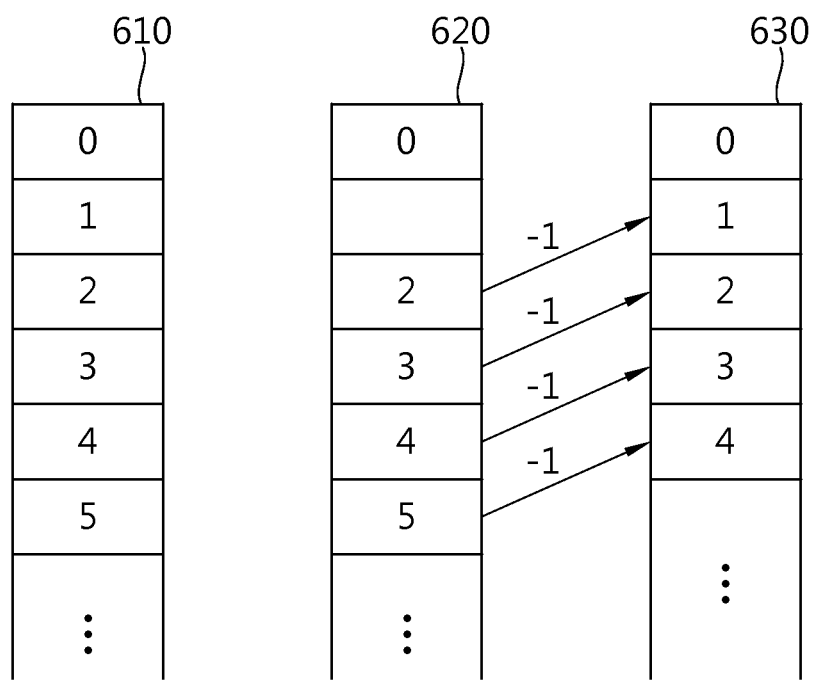
FIG. 6 is a conceptual diagram schematically illustrating an example of a remaining mode used to transmit intra prediction mode information.

FIG. 6 is a conceptual diagram schematically illustrating an example of a remaining mode used to transmit the intra prediction mode information. In the example illustrated in FIG. 6, it is assumed that the prediction mode of the MPM is 1 and the number of MPM candidates is 1. Hereinafter, the prediction mode of the current prediction unit is referred to as a current prediction mode and the mode value of the current prediction mode is referred to as a current mode value.

When all the prediction modes of the MPM candidates are different from the current prediction mode, the encoder may transmit information on the current prediction mode out of the prediction modes other than the MPM candidates to the decoder. Here, the encoder may transmit the prediction mode information using the current mode value when the mode values of all the MPM candidates are greater than the current mode value, and may transmit the prediction mode information using a value obtained by subtracting the number of MPM candidates having a mode value smaller than the current mode value from the current mode value when an MPM candidate having a mode value smaller than the current mode value is present. Here, a prediction mode having a mode value obtained by subtracting the number of MPM candidates having a mode value smaller than the current mode value from the current mode value may be referred to as a remaining mode.

Referring to FIG. 6, reference numeral 610 represents intra prediction modes which a current prediction unit can have. Since the prediction mode value of the MPM is 1, the predictions modes which the current prediction unit can have may be the prediction modes other than the prediction mode of which the mode value is 1 as represented by reference numeral 620 in FIG. 6. For example, when the current mode value is 2, the mode value of a current remaining mode may be 1 as represented by reference numeral 630 in FIG. 6. When the current mode value is 0, the mode value of the current remaining mode may be 0.

The decoder can see that a candidate having the same prediction mode as the current prediction unit is not present in the MPM candidates via the flag information such as prev_intra_luma_pred_flag.

Here, the decoder may calculate an actual prediction mode value of the current prediction unit using the remaining mode and the MPM. For example, it is assumed that the number of MPMs is N and the mode values of the MPM are mode1, mode2, . . . , modeN. Here, it is assumed that the smaller the X value modeX is, the smaller mode value is allocated. When X ranges from 1 to N−1 and the mode value of the remaining mode is greater than or equal to modeX−(X−1) and smaller than mode(X+1)−X, a value obtained by adding X to the mode value of the remaining mode may be the current prediction mode. When X is N and the mode value of the remaining mode is greater than or equal to modeN−(N−1), a value obtained by adding N to the mode value of the remaining mode may be the current prediction mode.

For example, when the current mode value in the example illustrated in FIG. 6 is 2, the mode value of the remaining mode received by the decoder may be 1. Since the mode value of the MPM is 1 and the number of MPM candidates is 1, the decoder may calculate the current mode value as 2 by adding 1 to the mode value of the remaining mode.

According to the example illustrated in FIG. 6, since the bit rate necessary for transmitting the current prediction mode can be reduced, it is possible to improve coding efficiency.

Figure 7:
FIG. 7 is a conceptual diagram schematically illustrating a configuration of an index mapping table used for entropy decoding.

FIG. 7 is a conceptual diagram schematically illustrating a configuration of an index mapping table used for entropy decoding.

An entropy encoding and decoding method may be used to encode and decode information such as DCT coefficients, motion vectors, and prediction modes requiring high coding efficiency. The symbols input in the course of entropy encoding and decoding may be converted into continuous codewords and the length of the codewords may be variable.

As described above, methods such as an exponential golomb method, a CAVLC (Context-Adaptive Variable Length Coding) method, a CABAC (Context-Adaptive Binary Arithmetic Coding) method may be used for the entropy encoding and decoding. An LCEC (Low Complexity Entropy Coding) may be used when low complexity is required for the entropy encoding and decoding, and the CABAC method may be used when high efficiency is required.

When the entropy encoding and decoding is applied, a short codeword may be allocated to a symbol having a high occurrence probability, and a long codeword may be allocated to a symbol having a low occurrence probability. Therefore, it is possible to reduce a bit rate for symbols to be encoded and decoded and it is possible to improve video compression performance by the entropy encoding and decoding.

When the CAVLC is applied, a predetermined VLC table may be used and the VLC table may be constructed on the basis of occurrence probabilities of symbols. The entropy decoding process will be schematically described below from the viewpoint of the decoder.

The decoder may acquire code numbers using a VLC table corresponding to codewords in an input bitstream from the input bitstream. Here, the code number may be referred to as a codeword index. The decoder may acquire values of syntax elements using a code number and an index mapping table corresponding to the code number. Here, the index mapping table may be referred to as a sorting table.

The index mapping table may be used to adaptively adjust the values of the syntax elements allocated to the code numbers on the basis of the occurrence frequencies. In an example, when a currently-input code number is A and A is greater than 0, the occurrence probability of the symbol corresponding to code number A increases and thus the value of the syntax element corresponding to code number A and the value of the syntac element corresponding to code number A−1 may be swapped with each other. That is, the index mapping table may be updated depending on the currently-input code number.

FIG. 7 illustrates an example of an index mapping table indicating a mapping relationship between the code numbers and intra prediction modes corresponding thereto. Here, the maximum value of the code numbers may be determined to be a predetermined value in advance. An inverse index mapping table corresponding to the index mapping table may be stored in the encoder.

When a code number of 3 is input to the index mapping table according to the example illustrated in FIG. 7, the intra prediction mode of a current prediction unit may be 0. Here, since the currently-input code number is 3, prediction mode 0 allocated to code number 3 and prediction mode 9 allocated to code number 2 may be swapped with each other. In the updated index mapping table, prediction mode 9 may be mapped on code number 3 and prediction mode 0 may be mapped on code number 2.

Figure 8:
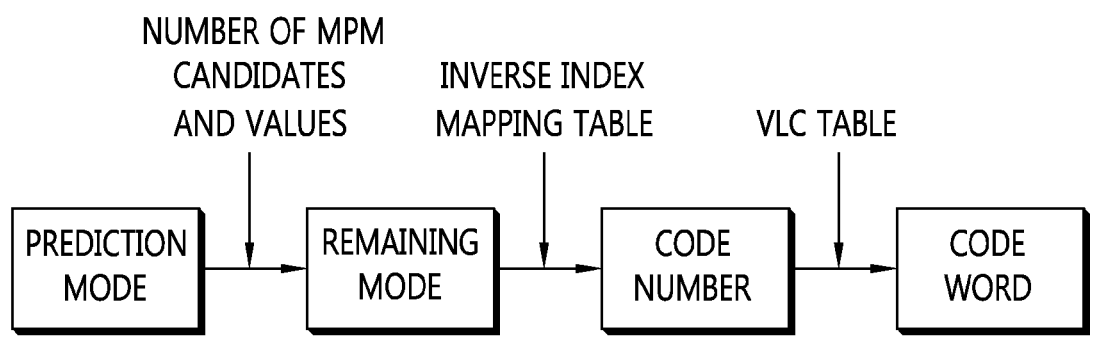
FIG. 8 is a conceptual diagram illustrating an example of an intra prediction mode encoding method using an MPM.

FIG. 8 is a conceptual diagram illustrating an example of an intra prediction mode encoding method using an MPM. FIG. 8 illustrates an example where a candidate having the same prediction mode as the current prediction unit is not present in the MPM candidates, for example, prev_intra_luma_pred_flag is 0.

Referring to FIG. 8, the encoder can derive a remaining mode corresponding to the current prediction mode from the current prediction mode information and the prediction mode information of the MPM candidates. The current prediction mode information may include a mode value of the current prediction mode, and the prediction mode information of the MPM candidates may include the number of MPM candidates and the mode values of the MPM candidates. Hereinafter, the remaining mode corresponding to the current prediction mode is referred to as a current remaining mode.

For example, when the number of MPM candidates is 1, the mode value of the MPM candidate is 2, and the current prediction mode is 3, the current remaining mode may be 2. Since the mode value of the MPM candidate is smaller than the mode value of the current prediction mode, the current remaining mode may have a value obtained by subtracting 1 from the mode value of the current prediction mode. For example, when the number of MPM candidates is 2, the mode values of the MPM candidates are 1 and 2, and the current prediction mode is 3, the current remaining mode may be 1. Since the mode values of the two MPM candidates are smaller than the mode value of the current prediction mode, the current remaining mode may have a value obtained by subtracting 2 from the mode value of the current prediction mode.

The encoder may create a code number using the current remaining mode and an inverse index mapping table corresponding to the current remaining mode. The code number may be called codeword index and may indicate ranking of the current remaining mode in the inverse index mapping table. Therefore, the code number in this case may be called table index.

The number of prediction modes which the current prediction unit can have may vary depending on the size of the current prediction unit. The number of remaining modes which the current prediction unit can have may vary depending on the number of MPM candidates. The number of entries of the inverse index mapping table is equal to the number of remaining modes which the current prediction unit can have. Accordingly, when the number of remaining modes which the current prediction unit can have varies, the inverse index mapping table to be used may vary. Therefore, a predetermined number of inverse index mapping tables may be stored in the encoder. The encoder may select and use an inverse index mapping table of the predetermined number of inverse index mapping tables from the information on the size of the current prediction unit and the number of MPM candidates.

The encoder may convert a code number into a codeword using a VLC table and may transmit the codeword to the decoder.

Figure 9:
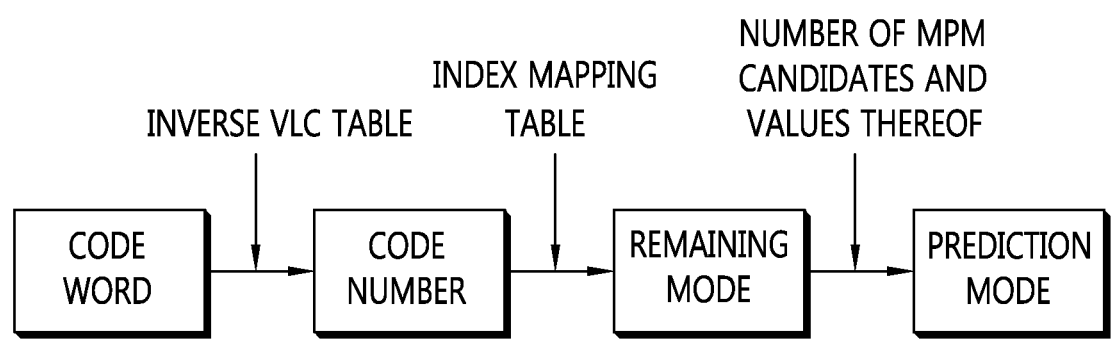
FIG. 9 is a conceptual diagram illustrating an example of an intra prediction mode decoding method using an MPM.

FIG. 9 is a conceptual diagram illustrating an example of an intra prediction mode decoding method using an MPM. FIG. 9 illustrates an example where a candidate having the same prediction mode as the current prediction unit is not present in the MPM candidates, for example, prev_intra_luma_pred_flag is 0. In this case, the remaining mode of the current prediction unit may be parsed.

Referring to FIG. 9, the decoder may convert a codeword received from the encoder into a code number using an inverse VLC table. The code number may be referred to as a codeword index and may indicate ranking of the current remaining mode in the index mapping table used for decoding. Therefore, the code number may be referred to as a table index.

The decoder may create a remaining mode using the code number and the index mapping table corresponding to the current code number.

For the same reason as described in the example illustrated in FIG. 8, a predetermined number of index mapping tables may be stored in the decoder. The decoder may select and use one index mapping table out of the predetermined number of index mapping tables on the basis of information on the size of the current prediction unit and the number of MPM candidates. The number of entries in the index mapping table may be equal to the number of remaining modes which the current prediction unit can have.

The decoder may derive the current prediction mode from the current remaining mode information and the prediction mode information of the MPM candidates. The current remaining mode information may include the mode value of the current remaining mode, and the prediction mode information of the MPM candidates may include the number of MPM candidates and the mode values of the MPM candidates.

For example, when the number of MPM candidates is 1, the mode value of the MPM candidate is 2, and the current remaining mode is 2, the current prediction mode may be 3. Since the mode value of the MPM candidate is equal to the mode value of the current remaining mode, the current prediction mode may be a value obtained by adding 1 to the mode value of the current remaining mode. For example, when the number of MPM candidates is 2, the mode values of the MPM candidates are 1 and 2, and the current remaining mode is 1, the mode value of the current remaining mode is equal to a value (the number of MPM candidates-1) obtained by subtracting 1 from 2 which is the largest value of the mode values of the MPM candidates. Therefore, the decoder may calculate the mode value 3 of the current prediction mode by adding 2 (the number of MPM candidates) to the mode value of the current remaining mode.

Hereinafter, the inverse index mapping table and the index mapping table are generically referred to as mapping tables.

The inverse index mapping table may be directly applied to the remaining mode in the example illustrated in FIG. 8, and the remaining mode may be created directly when the index mapping table is applied to the code number in the example illustrated in FIG. 9. Therefore, the number of entries of the mapping table is equal to the number of remaining modes which the current prediction unit can have. Since the number of remaining modes can vary depending on the number of MPM candidates, the encoder may have a demerit that different inverse index mapping tables are used depending on the number of MPM candidates in the example illustrated in FIG. 8. In the example illustrated in FIG. 9, the decoder may have a demerit that different index mapping tables are used depending on the number of MPM candidates. However, when a fixed number of MPM candidates are used, the above-mentioned problem may not occur. In the examples illustrated in FIGS. 8 and 9, the remaining modes may not be transmitted when a candidate having the same prediction mode as the current prediction unit is present in the MPM candidates. In this case, since the mapping table may not be updated, the distribution of intra prediction modes may not be sufficiently reflected in the mapping table. In the examples illustrated in FIGS. 8 and 9, the mapping table is updated depending on the current remaining mode instead of the actual prediction mode of the current prediction unit. Therefore, since the mapping table reflects the distribution of remaining modes instead of the actual intra prediction modes, characteristics of current contents may not be directly reflected in the mapping table.

Therefore, an intra prediction mode encoding/decoding method for more directly reflecting the actual prediction modes of the current prediction unit and characteristics of contents may be provided.

Figure 10:
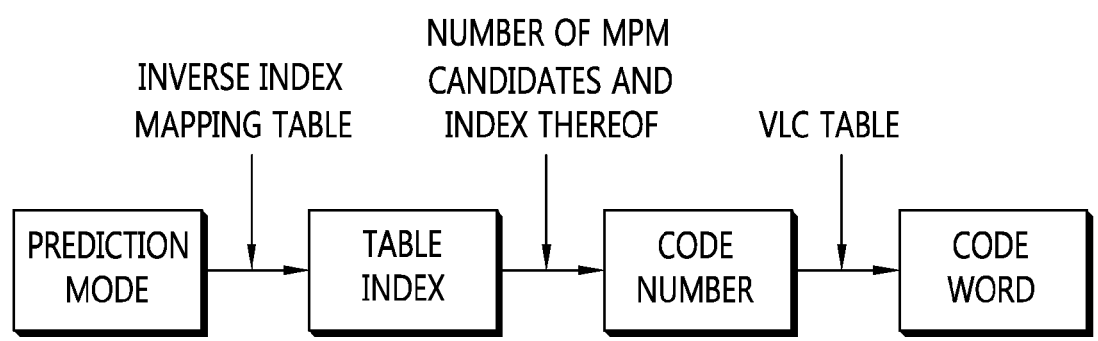
FIG. 10 is a conceptual diagram illustrating another example of the intra prediction mode encoding method using an MPM.

FIG. 10 is a conceptual diagram illustrating another example of the intra prediction mode encoding method using an MPM. FIG. 10 illustrates an example where a candidate having the same prediction mode as the current prediction unit is not present in the MPM candidates, for example, prev_intra_luma_pred_flag is 0.

Referring to FIG. 10, the encoder may create the table index of the current prediction mode by directly applying an inverse index mapping table to the prediction mode of the current prediction unit. In this case, the table index may indicate ranking of the current prediction mode in the inverse index mapping table. Here, the number of entries of the inverse index mapping table may be equal to the number of prediction modes which the current prediction unit can have instead of the number of remaining modes.

The table index of the current prediction mode is hereinafter referred to as a current table index. For example, in the examples illustrated in FIGS. 10 and 11, the current table index may indicate an index allocated to the current prediction mode in the inverse index mapping table. Here, when the inverse index mapping table is applied to the current prediction mode, the current table index may be output. In the examples illustrated in FIGS. 10 and 11, an index of an MPM candidate means an index allocated to the MPM candidate in the inverse index mapping table and may be called MPM index.

The encoder may derive a code number from current table index information and index information of MPM candidates. The current table index information may include the index value of the current table index, and the index information of MPM candidates may include the number of MPM candidates and index values of the MPM candidates. The code number may also be referred to as a codeword index. Details of the process of converting the current table index into the code number will be described later.

The encoder may convert the code number into a codeword using the VLC table and may transmit the codeword to the decoder.

Figure 11:
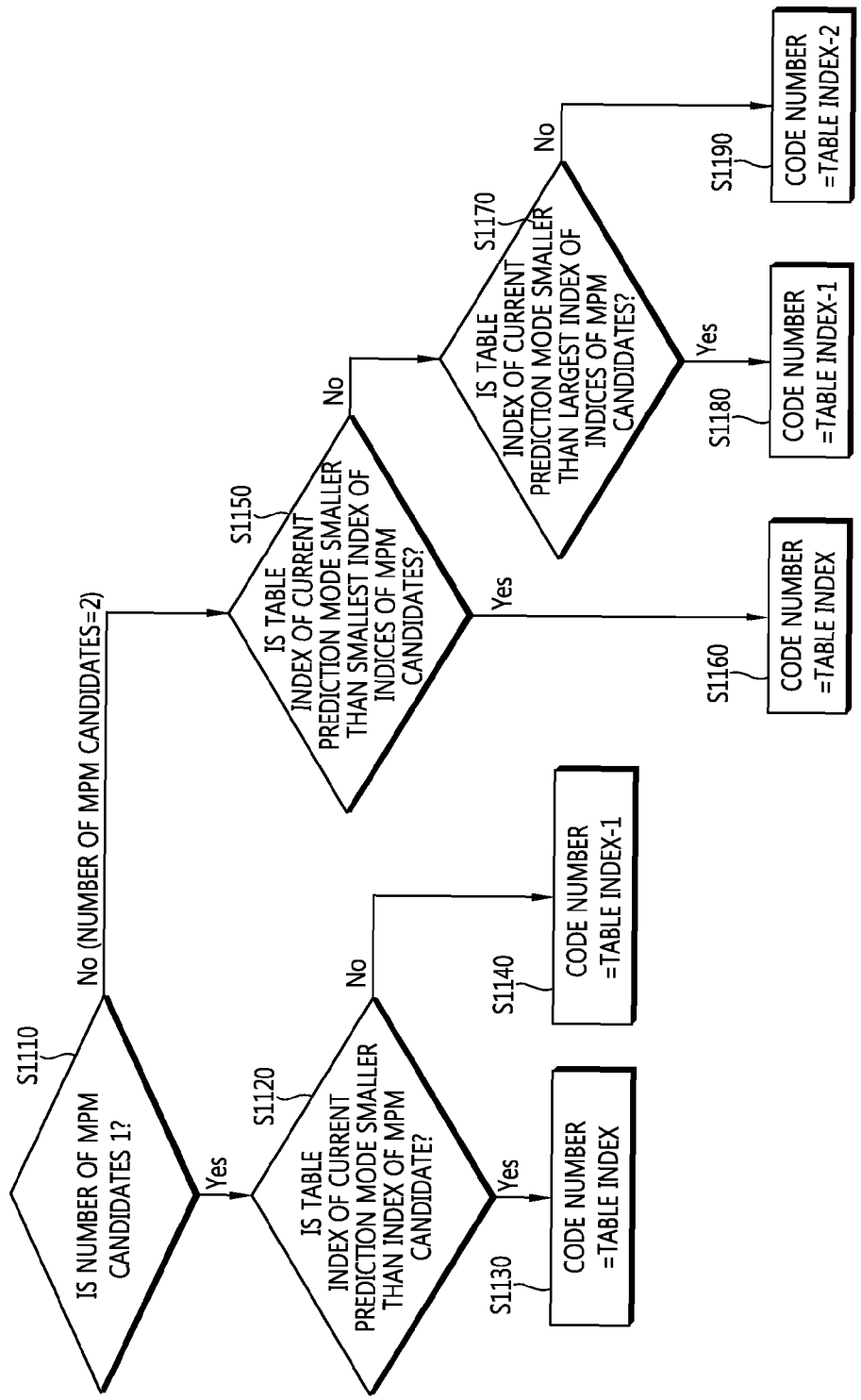
FIG. 11 is a flowchart illustrating an example of a method of converting a current table index into a code number.

FIG. 11 is a flowchart illustrating an example of a method of converting the current table index into the code number. In the example illustrated in FIG. 11, it is assumed that the maximum number of MPM candidates is two.

Referring to FIG. 11, the encoder may determine whether the number of MPM candidates is 1 (S1110).

When the number of MPM candidates is 1, the encoder may determine whether the table index of the current prediction mode is less than the index of the MPM candidate (S1120). When the current table index is less than the index of the MPM candidate, the code number may have the same value as the current table index (S1130). When the current table index is not less than the index of the MPM candidate, the code number may have a value obtained by subtracting 1 from the value of the current table index (S1140).

When the number of MPM candidates is not 1 but 2, the encoder may determine whether the table index of the current prediction mode is less than the smallest index of the indices of the MPM candidates (S1150). When the current table index is less than the smallest index of the indices of the MPM candidates, the code number may have the same value as the current table index (S1160).

When the current table index is not less than the smallest index of the indices of the MPM candidates, the encoder may determine whether the table index of the current prediction mode is less than the largest index of the indices of the MPM candidates (S1170). When the current table index is less than the largest index of the indices of the MPM candidates, the code number may have a value obtained by subtracting 1 from the value of the current table index (S1180). When the current table index is not less than the largest index of the indices of the MPM candidates, the code number may have a value obtained by subtracting 2 from the value of the current table index (S1190).

For example, when the number of MPM candidates is 1, the index value of the MPM candidate is 2, and the value of the current table index is 3, the code number may be 2. Since the index value of the MPM candidate is less than the value of the current table index, the code number may have a value obtained by subtracting 1 from the value of the current table index. For example, when the number of MPM candidates is 2, the index values of the MPM candidates are 1 and 2, and the value of the current table index is 3, the code number may be 1. Since the index values of the two MPM candidates are less than the value of the current table index, the code number may have a value obtained by subtracting 2 from the value of the current table index.

The process of conversion from the current table index into the code number is similar to the process of conversion from the current prediction mode into the remaining mode described in the example illustrated in FIG. 8.

Figure 12:
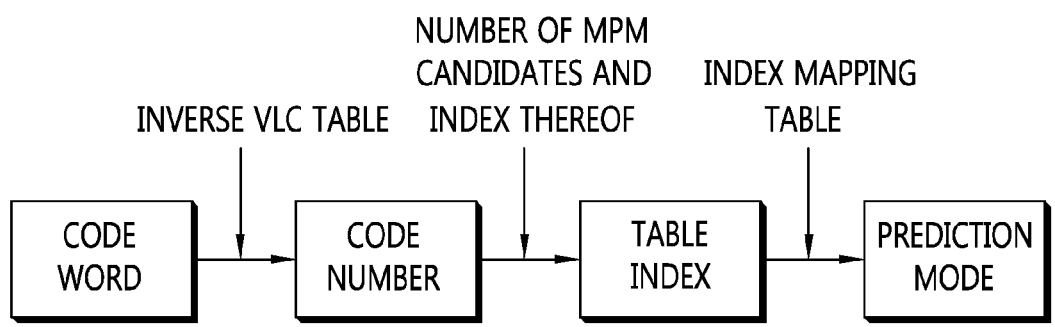
FIG. 12 is a conceptual diagram illustrating another example of the intra prediction mode decoding method using an MPM.

FIG. 12 is a conceptual diagram illustrating another example of the intra prediction mode decoding method using an MPM. FIG. 12 illustrates an example where a candidate having the same prediction mode as the current prediction unit is not present in the MPM candidates, for example, prev_intra_luma_pred_flag is 0.

Referring to FIG. 12, the decoder may convert a codeword received from the encoder into a code number using an inverse VLC table. The code number may be referred to as a codeword index.

The decoder may create a current table index from the code number and index information of MPM candidates. The index information of the MPM candidates may include the number of MPM candidates and the index values of the MPM candidates. In the example illustrated in FIGS. 12 and 13, the index of an MPM candidate means an index allocated to the MPM candidate in the index mapping table used for decoding.

The current table index may indicate ranking of the current prediction mode in the index mapping table used for decoding. For example, in the examples illustrated in FIGS. 12 and 13, the current table index may indicate an index allocated to the current prediction mode in the index mapping table. Here, when the index mapping table is applied to the current table index, the current prediction mode may be output. Details of the process of conversion from the code number into the current table index will be described later.

The decoder may derive the current prediction mode using the current table index and the index mapping table. In the example illustrated in FIG. 12, the index mapping table may not be directly applied to the code number but may be applied to the current table index created using the index information of the MPM candidates. Here, the number of entries in the index mapping table may not be equal to the number of remaining modes, but may be equal to the number of intra prediction modes which the current prediction unit can have.

In order to convert the code number into the current table index, the decoder needs to find the index values of the MPM candidates. An input to the index mapping table may be one of the indices including the current table index, and an output thereof may be one of the intra prediction modes including the current prediction mode. Therefore, the decoder may find the index value of the MPM by sequentially inputting possible index values to the index mapping table and finding out an index having the mode value of the MPM as an output.

In order to reduce this calculation load, an inverse index mapping table may be stored in the decoder. An input to the inverse index mapping table may be one of the intra prediction modes and an output thereof may be one of the indices including the current table index. Here, the decoder may acquire the index value of the MPM without any particular calculation by directly applying the inverse index mapping table to the mode values of the MPM.

Figure 13:
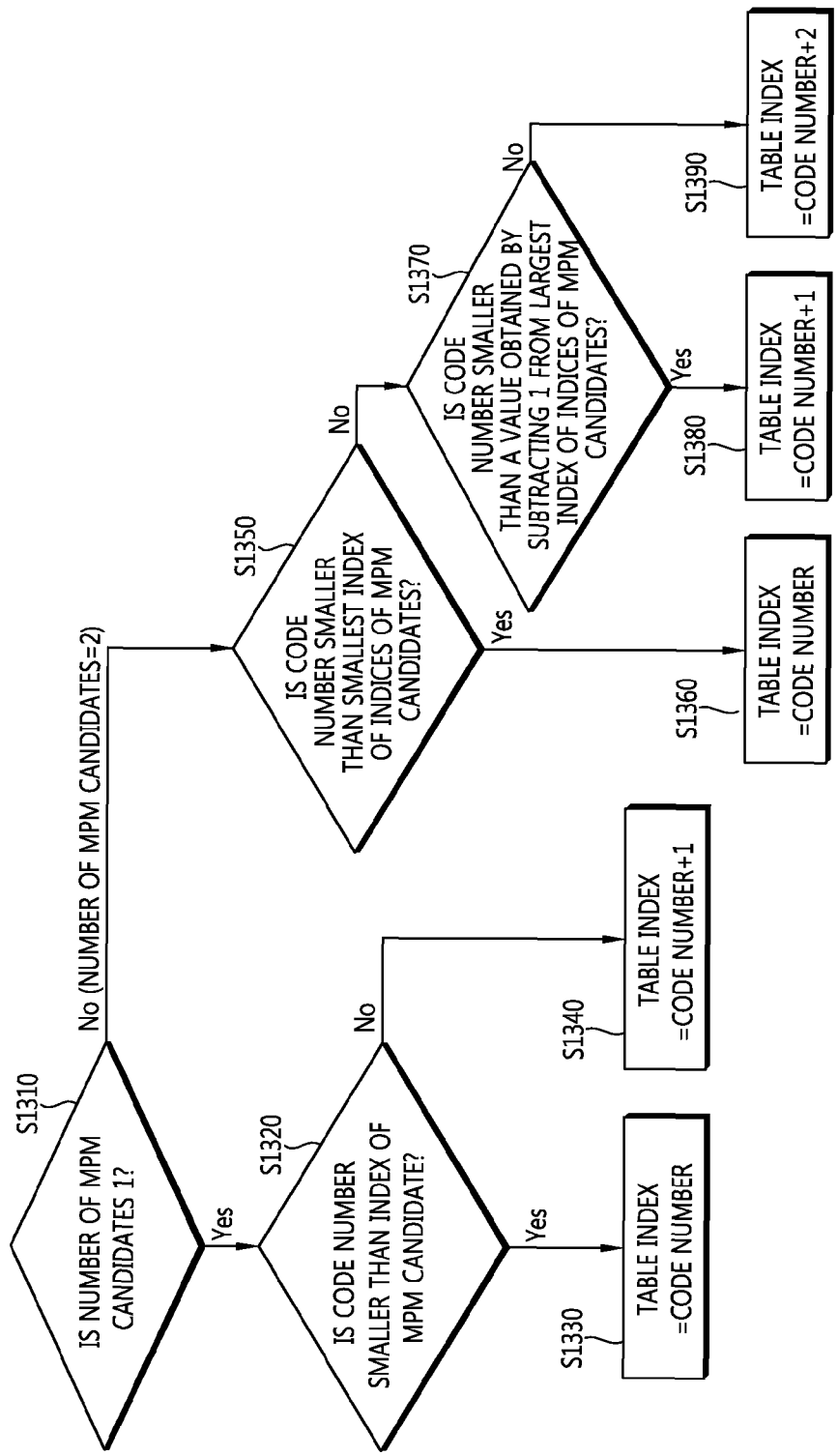
FIG. 13 is a flowchart illustrating an example of a method of converting a code number into a current table index.

FIG. 13 is a flowchart illustrating an example of a method of converting a code number into a current table index. In the example illustrated in FIG. 13, it is assumed that the maximum number of MPM candidates is 2.

Referring to FIG. 13, the decoder may determine whether the number of MPM candidates is 1 (S1310).

When the number of MPM candidates is 1, the decoder may determine whether the current code number is smaller than the index of the MPM candidate (S1320). When the code number is smaller than the index of the MPM candidate, the current table index may have the same value as the code number (S1330). When the code number is not smaller than the index of the MPM candidate, the current table index may have a value obtained by adding 1 to the value of the code number (S1340).

When the number of MPM candidates is not 1 but 2, the decoder may determine whether the current code number is smaller than the smallest index of the indices of the MPM candidates (S1350). When the code number is smaller than the smallest index of the indices of the MPM candidates, the current table index may have the same value as the code number (S1360).

When the code number is not smaller than the smallest index of the indices of the MPM candidates, the decoder may determine whether the current code number is smaller than a value obtained by subtracting 1 from the largest index of the indices of the MPM candidates (S1370). When the code number is smaller than a value obtained by subtracting 1 from the largest index of the indices of the MPM candidates, the current table index may have a value obtained by adding 1 to the value of the code number (S1380). When the code number is not smaller than a value obtained by subtracting 1 from the largest index of the indices of the MPM candidates, the current table index may have a value obtained by adding 2 to the value of the code number (S1390).

For example, when the number of MPM candidates is 1, the index value of the MPM candidate is 2, and the current code number 2, the current table index may be 3. Since the current code number is not smaller than the index value of the MPM candidate, the current table index may have a value obtained by adding 1 to the current code number.

The process of conversion from the code number into the current table index is similar to the process of conversion from the remaining mode into the current prediction mode in the example illustrated in FIG. 9.

An example of the process of conversion from the code number into the current table index depending on the number of MPMs will be specifically described below. In the example to be described below, the code number may be expressed by preCodeNum and the current table index may be expressed by codeNum. The decoder may derive preCodeNum from the codeword using the inverse VLC table, and may derive codeNum from preCodeNum using the number of MPMs and the index values of the MPMs. The decoder may derive the current prediction mdoe from codeNum using the index mapping table.

For example, it is assumed that the number of MPMs is 1 and the index value of the MPM corresponding to the mode value of the MPM in the index mapping table is codeNum-Ori_Prev1. Here, when codeNum-Ori_Prev1 is input to the index mapping table, the mode value of the MPM may be output.

When preCodeNum is smaller than codeNum-Ori_Prev1, the value of preCodeNum may be allocated to codeNum. When preCodeNum is greater than or equal to codeNum-Ori_Prev1, the value of preCodeNum+1 may be allocated to codeNum.

For example, it is assumed that the number of MPMs is 2 and the index values of the MPMs corresponding to the mode values of the MPM in the index mapping table are codeNum-Ori_Prev1 and codeNum-Ori_Prev2. Here, when codeNum-Ori_Prev1 and/or codeNum-Ori_Prev2 are input into the index mapping table, the mode values of the MPMs may be output therefrom. It is assumed that codeNum-Ori_Prev1 is smaller than codeNum-Ori_Prev2.

When preCodeNum is smaller than codeNum-Ori_Prev1, the value of preCodeNum may be allocated to codeNum. When preCodeNum is greater than or equal to codeNum-Ori_Prev1 and is smaller than codeNum-Ori_Prev2−1, the value of preCodeNum+1 may be allocated to codeNum. When preCodeNum is greater than or equal to codeNum-Ori_Prev2−1, the value of preCodeNum+2 may be allocated to codeNum.

For example, it is assumed that the number of MPMs is N and the index values of the MPMs corresponding to the mode values of the MPMs in the index mapping table are codeNum-Ori_Prev1, codeNum-Ori_Prev2, . . . , and codeNum-Ori_PrevN. Here, when codeNum-Ori_Prev1, codeNum-Ori_Prev2, . . . , and codeNum-Ori_PrevN are input to the index maping table, the mode values of the MPMs may be output. It is assumed that codeNum-Ori_PrevX are arranged in the ascending order of the MPM index values allocated thereto. That is, it is assumed that the greater the value of X is, the larger MPM index value is allocated.

When preCodeNum is smaller than codeNum-Ori_Prev1, the value of preCodeNum may be allocated to codeNum. When preCodeNum is greater than or equal to codeNum-Ori_Prev1 and is smaller than codeNum-Ori_Prev2−1, the value of preCodeNum+1 may be allocated to codeNum. When preCodeNum is greater than or equal to codeNum-Ori_Prev2−1 and is smaller than codeNum-Ori_Prev3−2, the value of preCodeNum+2 may be allocated to codeNum.

Generalizing the examples, when X has a value of 1 to N−1 and preCodeNum is greater than or equal to codeNum-Ori_PrevX−(X−1) and is smaller than codeNum-Ori_Prev(X+1)−X, the value of preCodeNum+X may be allocated to codeNum. When X is equal to N and preCodeNum is greater than or equal to codeNum-Ori_PrevN−(N−1), the value of preCodeNum+N may be allocated to codeNum.

An example of the intra prediction mode decoding process illustrated in FIGS. 12 and 13 will be described below from the viewpoint of the decoder.

The position of a current block in a current picture, the size of a current prediction unit, the intra prediction mode of a neighboring block previously reconstructed, an index mapping table, and an inverse index mapping table may be input for the process. A current intra prediction mode of the current prediction unit, an updated index mapping table, and an updated inverse index mapping table may be output. The input and the output may be expressed as follows.

---

Inputs to this process are:
    a luma location ( xB, yB ) specifying the top-left luma sample of the current block relative to the top-left luma sample of the current picture,
    a variable log2TrafoSize specifying the size of the current prediction unit,
    variable arrays IntraPredMode (If available) that are previously (in decoding order) derived for adjacent coding units.
    a variable array intraModeTable
    a variable array invIntraModeTable
Output of this process is the variable IntraPredMode[ xB ][ yB ], value-updated intraModeTable and value-updated invIntraModeTable.

---

Here, intraModeTable may represent an index mapping table, and invIntraModeTable may represent an inverse index mapping table.

The decoder may derive neighboring blocks to be used to derive MPM candidates and may derive the intra prediction modes of the derived neighboring blocks.

---

1.   The derivation process for neighbouring treeblocks specified in subclause XXX with (xB, yB ) given as input and the output is assigned to tbAddrA and tbAddrB specifying the treeblock addresses of treeblocks covering ( xBA, yBA ) and ( xBB, yBB ) respectively where ( xBA, yBA ) is set equal to ( xB-1, yB ) and ( xBB, yBB ) is set equal to ( xB, yB-1 ).
2. For N being either replaced A or B, the variables intraPredModeN are derived as follows.
    If the treeblock with address tbAddrN is not available, intraPredModeN is set equal to −1
    Otherwise, if the coding unit covering ( xBN, yBN ) is not coded as intra mode, intraPredModeN is set equal to Intra_DC,
    Otherwise, intraPredModeN is set equal to
    IntraPredMode[ xBN ][ yBN ], where IntraPredMode is the variable array assigned to the coding unit covering the luma location ( xBN, yBN ).
3. For N being either replaced A or B, the variables intraPredModeN are further modified to be equal to Intra_DC when intraPredModeN is equal to Intra_Planar.

The decoder may derive MPM candidates using the intra prediction modes of the neighboring blocks, which may be expressed as follows.

4. For N being either replaced A or B, the variables candIntraPredModeN are derived as follows.
    If intraPredModeN is greater than or equal to intraPredModeNum
        If intraPredModeNum is equal to 4 then candIntraPredModeN is set equal to mapIntraPredMode3[ intraPredModeN ]
        Otherwise candIntraPredModeN is set equal to mapIntraPredMode9[ intraPredModeN ].
    Otherwise, candIntraPredModeN is set equal to intraPredModeN Here, candIntraPredModeN represents an MPM candidate.

The decoder may derive an MPM candidate list and the number of MPM candidates included in the list using the derived MPM candidates. This process may be expressed as follows.

5. The candModeList[x] and NumMPMCand are derived as follows:
    If both candIntraPredModeN are not available, then the value 2
    is assigned to candModeList[ 0 ] and NumMPMCand is set equal to 1
    Otherwise, if only one candIntraPredModeN is available or if both candIntraPredModeN are the same, then this candIntraPredModeN is assigned to candModeList[ 0 ] and NumMPMCand is set equal to 1
    Otherwise, both candIntraPredModeN are assigned to the candidate modes list with the smaller of the two candidates at candModeList[ 0 ] and the larger at candModeList[ 1 ] and NumMPMCand is set equal to 2.

Here, candModeList represents the MPM candidate list and NumMPMCand represents the number of MPM candidates.

The decoder may derive the index values of the MPMs depending on the number of prediction modes which the current prediction unit can have. The decoder may use the inverse index mapping table to derive the index values of the MPMs and may construct the MPM index list using the derived index values of the MPMs. This process may be expressed as follows.

6. The value of k is derived as follows:
    If intraPredModeNum is equal to 17, the variable k is set equal to 0.
    Otherwise, k is set equal to 1.
7. If intraPredModeNum is not equal to 3, rankCandModeList[ x ] are derived as follows:
    If NumMPMCand is equal to 1, invIntraModeTable[ k ] [ candModeList[ 0 ] ] is assigned to rankCandModeList[ 0 ].
    Oterwise, both invIntraModeTable[ k ] [ candModeList[ x ] ] are
    assigned to the ranks of candidate modes list with the smaller of the two rank at rankCandModeList[ 0 ] and the larger at rankCandModeList[ 1 ].

Here, intraPredModeNum represents the number of prediction modes which the current prediction unit can have. The condition of intraPredModeNum in the above expression is not limited to 3 and/or 17, but for example, 4 and/or 18 may be used instead of 3 and/or 17.

When a candidate having the same prediction mode as the current prediction unit is present in the MPM candidates, the decoder may derive the current prediction mode from the MPMs.

When a candidate having the same prediction mode as the current prediction unit is not present in the MPM candidates, the decoder may derive the current table index from the code number. The decoder may derive the current prediction mode by applying the index mapping table to the derived current table index. Here, when the number of intra prediction modes which the current prediction unit can have is 3, a particular index mapping table may not be applied. This process may be expressed as follows. Here, rem_intra_luma_pred_mode corresponds to the code number and rank_intra_luma_pred_mode corresponds to the current table index.

8. IntraPredMode[ xB ][ yB ] is derived by applying the following procedure.
    If prev_intra_pred_flag[ xB ][yB ] is true, the IntraPredMode[ xB ][yB ] is set equal to candModeList[mpm_idx[ xB ][ yB ]]
    Otherwise IntraPredMode[ xB ][ yB ] is derived by applying the following procedure
        If intraPredModeNum is equal to 3 or entropy_coding_mode_flag is equal to 1,
            IntraPredMode[ xB ][ yB ] = rem_intra_pred_mode
            for (cIdx = 0; cIdx < NumMPMCand; cIdx++)
                if (IntraPredMode[ xB ][ yB ]>= candModeList[cIdx])
                      IntraPredMode[ xB ][ yB ]++
    Otherwise, the following applies,
        The variable rank_intra_luma_pred_mode is set equal to rem_intra_luma_pred_mode.
        for (cIdx = 0 ; cIdx < NumMPMCand; cIdx++)
            if (rank_intra_luma_pred_mode >= rankCandModeList[cIdx] )
                rank_intra_luma_pred_mode ++
    IntraPedMode[ xB ] [yB ] is set equal to IntraModeTable[ k ] [rank_intra_luma_pred_mode] .
9. When IntraPredMode[ xB ][ yB ] is equal to Intra_DC and planar_flag_luma is equal to 1, IntraPredMode[ xB ][yB ] is further modified to be equal to Intra_Planar.

The condition of intraPredModeNum in the above expression is not limited 3, but for example, 4 may be used instead of 3.

The decoder may update the index mapping table and the inverse index mapping table. This process may be expressed as follows.

10. If intraPredModeNum is not equal to 3 and entropy coding_mode_flag is equal to 0, the following applies:
    The value of a variable counterNum is set to 0. The variable array intraModeTable[k] is updated by invoking process in subclause 9.2.3 with intraModeTable[k], rem_intra_luma_pred_mode and counterNum as inputs.
The variable array invIntraModeTable[ k ] is updated by invoking process in subclause 9.2.X with invIntraModeTable[k], rem_intra_luma_pred_mode as inputs.

The condition of intraPredModeNum in the above expression is not limited to 3, but for example, 4 may be used instead of 3.

A parsing process for deriving the code number may be expressed as follows. Here, parts in which a strike-through (a line horizontally passing through the center of a character and/or a sentence) is marked are parts associated with use of the index mapping table and are parts not used in the parsing process.

This process is invoked when entropy_coding_mode_flag is equal to 0 for parsing syntax element rem_intra_luma_pred_node in subclause 7.3.7.
Inputs to this process are bits from slice data, a variable puSize specifying the size of the current prediction unit, NumMPMCand. ~~and a variable array intraModeTable~~.
Outputs of this process are the syntax element rem_intra_luma_pred_mode. ~~and value updated intraModeTable~~.
The value of rem_intra_luma_pred_mode is derived as follows.
  Based on the input puSize, the value of a variable intraPredModeNum indicating the number of intra prediction modes for the given size of prediction unit is obtained according to Table 7-11.
  If intraPredModeNum is equal to 3, read one bit and assign its value to rem_intra_luma_pred_mode. No further step is carried out. Othewise,
  The values of variable ~~k and~~ vlcNum are is obtained as follows
    If intraPredModeNum is equal to 17
      If NumMPMCand is equal to 1, set vlcNum equal to 16. ~~and k equal to 0.~~
      Otherwise, set vlcNum equal to 17. ~~and k equal to 1.~~
    If intraPredModeNum is equal to 34
      If NumMPMCand is equal to 1, set vlcNum equal to 18. ~~and k equal to 2.~~
      Otherwise, set vlcNum equal to 19. ~~and k equal to 3.~~
    The parsing process described in subclause 9.2.1 is invoked with vlcNum as input and the variable ~~codeNum~~ rem_intra_luma_pred_mode as output.
    ~~The value of rem_intra_luma_pred_mode is set equal to intraModeTable[k][codeNum].~~
  ~~The value of a variable counterNum is set to 0. The variable array intraModeTable[k] is updated by invoking process in subclause 9.2.3 with intraModeTable[k], codeNum and counterNum as inputs.~~

Referring to the above-mentioned parsing process, since the decoder applies the index mapping table to the current table index after deriving the current table index from the code number, the index mapping table may not be used in the parsing process.

The intra prediction mode encoding/decoding method according to the example illustrated in FIGS. 10 to 13 may use the index mapping table and the inverse index mapping table.

When it is assumed that the number of prediction modes which the current prediction unit can have is 17, an example of source codes of the index mapping table and the inverse index mapping table may be expressed as follows.

const UInt g_auiIntraModeTableD17[17]={2, 3, 9, 15, 11, 7, 8, 4, 6, 0, 1, 12, 10, 16, 14, 5, 13}
const UInt g_auiIntraModeTableE17[17]={9, 10, 0, 1, 7, 15, 8, 5, 6, 2, 12, 4, 11, 16, 14, 3, 13}

Here, g_auiIntraModeTableD17 represents an index mapping table, and g_auiIntraModeTableE17 represents an inverse index mapping table. The numerals included in the lists represent the mode values of the prediction modes.

The indices of the index mapping table may be allocated to the prediction modes included in the lists. Here, the index of N−1 may be allocated to the N-th prediction mode in the lists. For example, since 9 in the index mapping table is the third prediction mode, index 2 may be allocated to prediction mode 9.

When it is assumed that the number of prediction modes which the current prediction unit can have is 34, an example of the source codes of the index mapping table and the inverse index mapping table may be expressed as follows.

const UInt g_auiIntraModeTableD34[34]={2, 0, 1, 30, 29, 8, 16, 21, 22, 15, 12, 9, 11, 3, 4, 7, 31, 5, 6, 32, 17, 20, 10, 19, 23, 13, 24, 28, 14, 27, 18, 26, 25, 33}
const UInt g_auiIntraModeTableE34[34]={1, 2, 0, 13, 14, 17, 18, 15, 5, 11, 22, 12, 10, 25, 28, 9, 6, 20, 30, 23, 21, 7, 8, 24, 26, 32, 31, 29, 27, 4, 3, 16, 19, 33}

Here, g_auiIntraModeTableD34 represents an index mapping table, and g_auiIntraModeTableE34 represents an inverse index mapping table. The numerals included in the lists represent the mode values of the prediction modes.

The indices of the index mapping table may be allocated to the prediction modes included in the lists. Here, index N−1 may be allocated to the N-th prediction mode in the lists. For example, since 30 in the index mapping table is the fourth prediction mode, index 3 may be allocated to prediction mode 30.

The intra prediction mode encoding/decoding method according to the examples illustrated in FIGS. 10 to 13 may employ a VLC table. For example, the VLC table may be constructed using Huffman codes.

When it is assumed that the number of prediction modes which the current prediction unit can have is 17 and the number of MPM candidates is 1 or 2, an example of the source codes of the VLC table may be expressed as follows.

```
const UInt huff17_2[2][17]=
{
{1, 7, 5, 13, 12, 9, 8, 6, 5, 4, 3, 2, 0, 15, 14, 3, 2},
{1, 6, 1, 14, 11, 10, 9, 8, 7, 6, 5, 4, 1, 0, 31, 30, 0},
}
const UInt lengthHuff17_2[2][17]=
{
{1, 4, 4, 5, 5, 5, 5, 5, 5, 5, 5, 5, 5, 6, 6, 6, 6},
{1, 4, 4, 5, 5, 5, 5, 5, 5, 5, 5, 5, 5, 6, 6, 0},
}
```

The upper list in huff17_2 and lengthHuff17_2 may be used when the number of MPM candidates is 1, and the lower list may be used when the number of MPM candidates is 2.

The first component in each list of huff17_2 and lengthHuff17_2 may be a component for indicating an MPM flag. Here, the MPM flag may be a flag for indicating whether a candidate having the same prediction mode as the current prediction unit is present in the MPM candidates and may be, for example, prev_intra_luma_pred_flag. When the value of the MPM flag is 1, information on the remaining mode may not be transmitted.

The second to final components in each list of huff17_2 and lengthHuff17_2 represent that the value of the MPM flag is 0 and represents the value of the code number to be transmitted. Here, since the remaining mode of the current prediction unit may be reflected in the code number, the code number may be called rank of the remaining mode.

Specifically, the components in huff17_2 represents values obtained by converting Huffman binary numerals into decimal numerals, and the components in lengthHuff17_2 represents the lengths of the Huffman binary numerals. Here, the length of a Huffman binary numeral may represent the length including bits (1 bit) for expressing the MPM flag. When the current code number is N, the encoder and/or the decoder may refer to the (N+2)-th component in each list of huff17_2 and lengthHuff17_2. This is because the first component in each list represents the MPM flag and the second component represents that the code number is 0.

For example, when the number of MPM candidates is 1 and the code number in the source code is 1, the encoder and/or decoder may refer to the third component in each upper list of huff17_2 and lengthHuff17_2. Since the third component in huff17_2 is 5 and the third component in lengthHuff17_2 is 4, the codeword corresponding to code number 1 may be "0101". Here, "0" located in the first bit represents the MPM flag and "101" located at the other three bits represent the code number, that is, the rank of a remaining mode.

When it is assumed that the number of prediction modes which the current prediction unit can have is 34 and the number of MPM candidates is 1 or 2, an example of the source code of the VLC table may be expressed as follows.

```
const UInt huff34_2[2][34]=
{
{1, 7, 0, 12, 8, 4, 27, 26, 19, 15, 13, 11, 10, 7, 5, 4, 47, 46, 45, 44, 43, 41, 40, 37, 36, 29, 25, 24, 13, 12, 85, 84, 57, 56},
{1, 0, 4, 13, 4, 28, 24, 22, 15, 13, 11, 10, 63, 62, 60, 59, 58, 51, 47,
46, 43, 42, 41, 40, 28, 25, 24, 123, 122, 101, 100, 59, 58, 0}
}
const UInt lengthHuff34_2[2][34]=
```

-continued

```
{
{1, 4, 4, 5, 5, 5, 6, 6, 6, 6, 6, 6, 6, 6, 6, 7, 7, 7, 7,
7, 7, 7, 7, 7, 7, 7, 7, 7, 7, 8, 8, 8, 8},
{1, 3, 4, 5, 5, 6, 6, 6, 6, 6, 6, 6, 7, 7, 7, 7, 7, 7, 7,
7, 7, 7, 7, 7, 7, 7, 8, 8, 8, 8, 8, 8, 0}
}
```

Here, the components in huff34_2 represents values obtained by converting Huffman binary numerals into decimal numerals, and the components in lengthHuff34_2 represents the lengths of the Huffman binary numerals. The method of mapping the codeword and the code number using the code is the same as described above.

As described in the example illustrated in FIG. 5, the encoder and the decoder may use a fixed number of MPM candidates. When it is assumed that the number of prediction modes which the current prediction unit can have is 18 and the number of MPM candidates is fixed to 2, an example of the source code of the VLC table may be expressed as follows.

```
const UInt huff17_2[18]={1, 7, 4, 1, 12, 10, 7, 6, 5, 4, 1, 0, 26, 23, 22, 55, 54, 0}
const UInt lengthHuff17_2[18]={1, 4, 4, 4, 5, 5, 5, 5, 5, 5, 5, 6, 6, 6, 7, 7, 0};
```

Here, since the number of MPM candidates is fixed to 2, huff17_2 and lengthHuff17_2 may each have only one list. The method of mapping the codeword and the code number using the code is the same as described above.

For example, when the code number in the source code is 1, the encoder and/or the decoder may refer to the third component in each list of huff17_2 and lengthHuff17_2. Since the third component in huff17_2, that is, hff17_2, is 4 and the third component in lengthHuff17_2, that is, lengthHff17_2[2], is 4, the codeword corresponding to code number 1 is "0100". Here, "0" located in the first bit represents the MPM flag and "100" located in the other third bits represents the code number, that is, the rank of a remaining mode.

When it is assumed that the number of prediction modes which the current prediction unit can have is 35 and the number of MPM candidates is fixed to 2, an example of the source code of the VLC table may be expressed as follows.

```
const UInt huff34_2[35] = { 1, 1, 4, 0, 12, 3, 28, 21, 5, 4, 63, 60, 58, 53, 47, 46, 45, 41, 40, 125, 124, 123, 119, 118, 111, 110, 109, 108, 105, 104, 89, 88, 245, 244, 0 };
const UInt lengthHuff34_2[35] = { 1, 3, 4, 4, 5, 5, 6, 6, 6, 6, 7, 7, 7, 7, 7, 7, 7, 7, 8, 8, 8, 8, 8, 8, 8, 8, 8, 8, 8, 8, 8, 9, 9, 0 };
```

Here, since the number of MPM candidates is fixed to 2, huff17_2 and lengthHuff17_2 may each have only one list. The method of mapping the codeword and the code number using the code is the same as described above.

An inverse index mapping table may be directly applied to the actual prediction mode of the current prediction unit in the example illustrated in FIG. 10, and the actual prediction mode of the current prediction unit may be directly obtained by applying the index mapping table to the current table index in the example illustrated in FIG. 12. Therefore, in the examples illustrated in FIGS. 10 to 13, the mapping tables may be updated depending on the actual prediction mode of the current prediction unit. Therefore, the mapping tables may reflect a distribution of actual intra prediction modes instead of the remaining modes. Through the use of the above-mentioned method, the encoder and the decoder may more effectively allocate codewords to directly reflect characteristics of current contents, thereby reducing a bit rate from the encoder to the decoder.

In the examples illustrated in FIGS. 8 and 9, the numbers of entries of the index mapping table and the inverse index mapping table are equal to the number of remaining modes which the current prediction unit can have. Therefore, in this case, different mapping tables should be used depending on the number of MPMs.

However, in the examples illustrated in FIGS. 10 to 13, the numbers of entries of the index mapping table and the inverse index mapping table are equal to the number of actual prediction modes which the current prediction unit can have. Since the number of actual prediction modes which the current prediction unit can have is fixed without depending on the number of MPMs, the encoder and the decoder do not need to use different mapping tables depending on the number of MPMs. Therefore, it is possible to save memory capacity and to more rapidly reflect the characteristics of contents in the mapping tables, thereby reducing the bit rate from the encoder to the decoder. Here, as described in the example illustrated in FIG. 12, the decoder may use a particular inverse index mapping table so as to derive the index values of the MPMs.

Table 1 shows an example schematically illustrating the number of mapping tables and the numbers of entries of the mapping tables necessary for the decoder depending on the intra prediction mode decoding method. In Table 1, it is assumed that the number of MPM candidates 1 or 2 and the number of prediction modes which the current prediction unit can have is 17 or 34. The number of prediction modes which the current prediction unit can have is not limited to the below example, but may vary depending on embodiments and necessities. For example, the number of prediction modes may be 18 instead of 17 or may be 35 instead of 34. In this case, the number of entries in each mapping table in Table 1 may vary.

TABLE 1

| Number of intra prediction modes | FIG. 9 | FIG. 12 |
|---|---|---|
| 17 | Two index mapping tables (number of entries: 15, 16) | One index mapping table (number of entries: 17) One index mapping table (number of entries: 17) |
| 34 | Two index mapping tables (number of entries: 32, 36) | One index mapping table (number of entries: 34) One index mapping table (number of entries: 34) |

Referring to Table 1, when the number of prediction modes which the current prediction unit can have is 17, the intra prediction mode decoding method according to the example illustrated in FIG. 9 may need two index mapping tables. Here, one of the two index mapping tables may have 15 entries and the other may have 16 entries. When the number of prediction modes which the current prediction unit can have is 34, the intra prediction mode decoding method according to the example illustrated in FIG. 9 may need two index mapping tables. Here, one of the two index mapping tables may have 32 entries and the other may have 33 entries.

When the number of prediction modes which the current prediction unit can have is 17, the intra prediction mode decoding method according to the example illustrated in FIG. 12 may need one index mapping table and one inverse index mapping table. Here, each mapping table may have 17 entries. When the number of prediction modes which the current prediction unit can have is 17, the intra prediction mode decoding method according to the example illustrated in FIG. 12 may need only one index mapping table having 17 entries. The decoder may derive the index values of the MPMs without using a particular inverse index mapping table.

When the number of prediction modes which the current prediction unit can have is 34, the intra prediction mode decoding method according to the example illustrated in FIG. 12 may need one index mapping table and one inverse index mapping table. Here, each mapping table may have 34 entries. When the number of prediction modes which the current prediction unit can have is 34, the intra prediction mode decoding method according to the example illustrated in FIG. 12 may need only one index mapping table having 34 entries. The decoder may derive the index values of the MPMs without using a particular inverse index mapping table.

On the other hand, as described in the example illustrated in FIG. 5, the encoder and the decoder may use a fixed number of MPM candidates. When the number of MPM candidates is fixed, the number of remaining modes may be fixed. In this case, when the number of prediction modes which the current prediction unit can have is 17 and 34, the intra prediction mode decoding method according to the example illustrated in FIG. 9 may use only one index mapping table.

In the examples illustrated in FIGS. 10 to 13, when a candidate having the same prediction mode as the current prediction unit is present in the MPM candidates, that is, when one of the MPM candidates is selected as a prediction mode of the current prediction unit, the remaining mode may not be transmitted to the decoder. However, the mapping tables used in the examples illustrated in FIGS. 10 to 13 are based on the actual prediction mode of the current prediction unit instead of the remaining modes. Accordingly, when one of the MPM candidates is selected as the current prediction mode, that is, when the remaining modes are not transmitted, the mapping tables may be updated. Therefore, the encoder and the decoder may more rapidly reflect a distribution of intra prediction modes in the mapping tables.

In the examples illustrated in FIGS. 10 to 13, a distribution of code number values may vary depending on whether the MPM candidate list includes a DC mode. When the MPM candidate list includes a DC mode, the occurrence frequency of the DC mode or the planar mode may increase. Therefore, in this case, the code number values reflecting the remaining modes other than the MPM candidates may be more evenly distributed in comparison with a case where the MPM candidate list does not include a DC mode. That is, when the MPM candidate list includes a DC mode, the occurrence frequency of a smaller code number may relatively decrease in comparison with a case where the MPM candidate list does not include a DC mode.

Therefore, when the MPM candidate list includes a DC mode, a different binarization method of code numbers may be applied to improve the coding efficiency. For example, when the MPM candidate list includes a DC mode, the codewords may be determined to allocate more bits to a smaller code number, in comparison with a case where the MPM candidate list does not include a DC mode.

Figure 14:
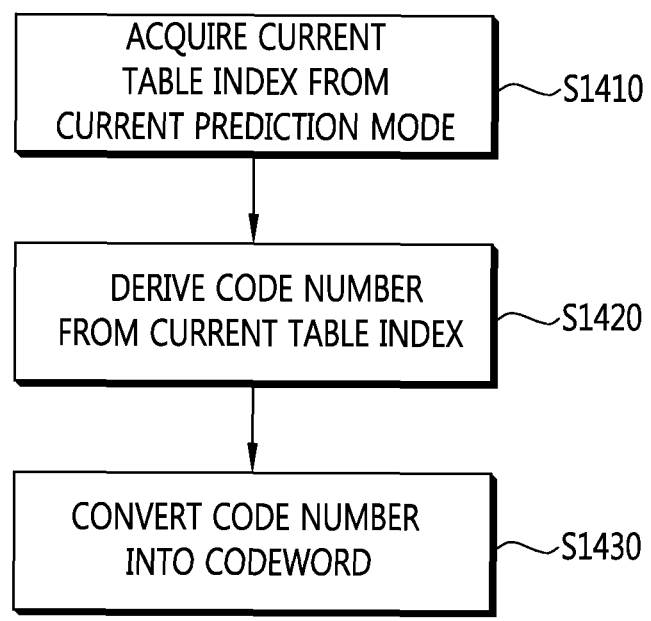
FIG. 14 is a flowchart schematically illustrating an intra prediction mode encoding method according to an embodiment of the invention.

FIG. 14 is a flowchart schematically illustrating an intra prediction mode encoding method according to an embodiment of the invention.

Referring to FIG. 14, the encoder acquires a current table index from a prediction mode of a current prediction unit (S1410). The encoder may directly apply an inverse index mapping table to the prediction mode of the current prediction unit to create a current table index of the current prediction mode. Here, the number of entries of the inverse index mapping table may be equal to the number of intra prediction modes which the current prediction unit can have. The example of the inverse index mapping table used to encode an intra prediction mode is the same as described above.

The encoder derives a code number from the current table index (S1420). The encoder may derive the code number from current table index information and index information of MPM candidates. The current table index information may include the value of the current table index and the index information of MPM candidates may include the number of MPM candidates and the index values of the MPM candidates. The code number may be referred to as a codeword index. Specific examples of the process of conversion from the current table index to the code number may be the same as described in the examples illustrated in FIGS. 10 and 11.

The encoder may convert the code number into a codeword using a VLC table and may transmit the codeword to the decoder (S1430). An example of the VLC table used to encode the intra prediction mode is the same as described above.

Figure 15:
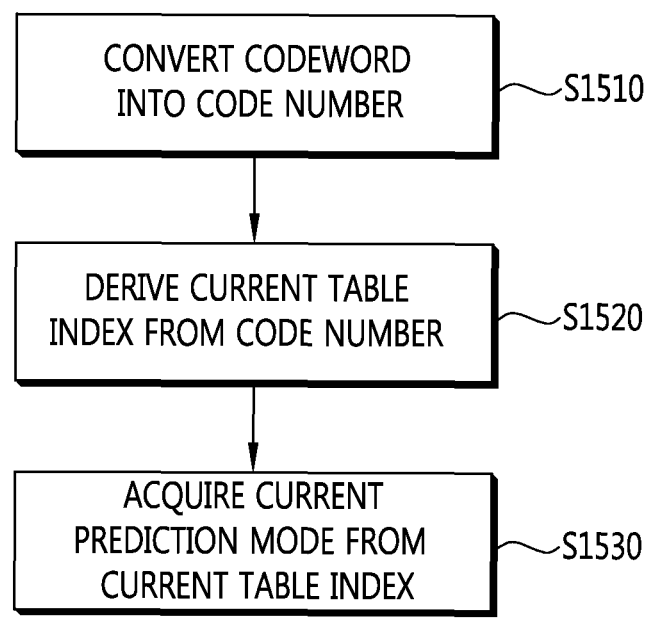
FIG. 15 is a flowchart schematically illustrating an intra prediction mode decoding method according to an embodiment of the invention.

FIG. 15 is a flowchart schematically illustrating an intra prediction mode decoding method according to an embodiment of the invention.

Referring to FIG. 15, the decoder may convert the codeword received from the encoder into the code number using an inverse VLC table (S1510). The code number may be referred to as a codeword index.

The decoder derives the current table index from the code number (S1520). The decoder may create the current table index using the code number and the index information of the MPM candidates. The index information of the MPM candidates may include the number of MPM candidates and the index values of the MPM candidates. The decoder may use an inverse index mapping table to derive the indices of the MPM candidates. Specific examples of the process of conversion from the current table index to the code number may be the same as described in the examples illustrated in FIGS. 12 and 13.

The decoder acquires the intra prediction mode of the current prediction unit from the current table index (S1530). The decoder may derive the current prediction mode by applying the index mapping table to the current table index. Here, the index mapping table may not be directly applied to the code number and may be applied to the current table index created using the index information of the MPM candidates. Here, the number of entries of the index mapping table may be equal to the number of intra prediction modes which the current prediction unit can have. An example of the index mapping table used to decode the intra prediction mode is the same as described above.

As described above with reference to FIGS. 1 to 3, the encoder and the decoder may use the CABAC as well as the CAVLC for the entropy encoding/decoding. In the CABAC entropy encoding method, the encoder may binarize a symbol and convert the binarized symbol into bins, and then may perform an arithmetic encoding process on the bins depending on the occurrence probabilities of the bins to create a bitstream. Here, the decoder may perform an entropy decoding process using the CABAC to correspond thereto.

The intra prediction mode encoding/decoding methods according to the embodiments illustrated in FIGS. 10 to 16 may be performed in the same way when the entropy encoding/decoding processes are performed using the CABAC as well as when the entropy encoding/decoding processes are performed using the CAVLC. Here, the encoder and the decoder may perform the CABAC entropy encoding/decoding processes using a mapping table in the same form as the mapping table described with reference to FIGS. 10 to 16, and the mapping table may reflect a distribution of actual intra prediction modes instead of the remaining modes.

While the methods in the above-mentioned examples have been described by a series of steps or blocks on the basis of flowcharts, the invention is not limited to the order of steps, and a certain step may be performed in an order other than described above or at the same time as described above. It will be understood by those skilled in the art that the steps included in the flowcharts are not exclusive and another step is added or one or more steps in the flowcharts is deleted without affecting the scope of the invention.

The above-mentioned embodiments include various examples. All possible combinations for implementing such various examples cannot be described herein but it will be understood by those skilled in the art that other combinations can be possible. Therefore, the invention includes all substitutions, corrections, and modifications belonging to the appended claims.

What is claimed is:

1. A video decoding method of predicting a current block in an intra mode, comprising the steps of:
   receiving, by a decoding apparatus, a bitstream;
   obtaining, by the decoding apparatus, information on an intra prediction mode for a current block by entropy decoding the bitstream based on context-adaptive variable length coding;
   deriving, by the decoding apparatus, a prediction pixel based on at least one neighboring reference pixel of the current block and the intra prediction mode; and
   generating, by the decoding apparatus, a reconstructed picture based on the prediction pixel,
   wherein obtaining the information on the intra prediction mode comprises:
   deriving, from the bitstream, a codeword for the intra prediction mode;
   obtaining a code number for the codeword based on a pre-determined variable length coding (VLC) table;
   deriving a table index for the codeword based on the code number, a number of most probable mode (MPM) candidates, and index values of the MPM candidates;
   deriving an index mapping table based on occurrence frequencies of intra prediction modes for previous blocks in a current slice in which the current block is located;
   deriving a value of a syntax element for the intra prediction mode of the current block by applying the table index to the index mapping table; and
   deriving the intra prediction mode based on the value of the syntax element.

2. The video decoding method according to claim 1, wherein a number of entries in the index mapping table is equal to a number of possible intra prediction modes of the current prediction unit.

3. The video decoding method according to claim 1, wherein a number of MPM candidates is a predetermined fixed value.

4. The video decoding method according to claim 3, wherein the predetermined fixed value is one of 2, 3, or 4.

5. A video decoder comprising:
an entropy decoding module that is configured to receive a bitstream and obtain information on an intra prediction mode for a current block by entropy decoding the bitstream based on context-adaptive variable length coding;
a prediction module configured to derive a prediction pixel based on at least one of neighboring reference pixels of the current block and the intra prediction mode; and
an adding module that is configured to generate a reconstructed picture based on the prediction pixel and a residual pixel,
wherein the entropy decoding module is further configured to:
derive a codeword for the intra prediction mode from the bitstream,
obtain a code number for the codeword based on a pre-determined variable length coding (VLC) table,
derive a table index for the codeword based on the code number, the number of most probable mode (MPM) candidates, and index values of the MPM candidates,
derive an index mapping table based on occurrence frequencies of code numbers for previous blocks in a current slice in which the current block is located,
derive a value of a syntax element for the intra prediction mode of the current block by applying the table index to the index mapping table, and
derive the intra current prediction mode based on the value of the syntax element.

6. The video decoding method according to claim 1, wherein the index mapping table is further based on a size of the current block.

7. The video decoding method according to claim 1, wherein obtaining the information on the intra prediction mode further comprises:
deriving a prev_intra_luma_pred_flag information from the bitstream,
wherein the codeword for the intra prediction mode is derived based on the prev_intra_luma_pred_flag information representing a value 0.

* * * * *